United States Patent [19]

Taketsugu

[11] Patent Number: 5,305,466
[45] Date of Patent: Apr. 19, 1994

[54] LOCATION REGISTRATION AND PAGING PROCEDURE FOR MOBILE COMMUNICATION

[75] Inventor: Masanori Taketsugu, Tokyo, Japan
[73] Assignee: NEC Corporation, Tokyo, Japan
[21] Appl. No.: 658,474
[22] Filed: Feb. 20, 1991

[30] Foreign Application Priority Data

Feb. 20, 1990 [JP] Japan ................................. 2-39076
Feb. 20, 1990 [JP] Japan ................................. 2-39077
Apr. 16, 1990 [JP] Japan ................................. 2-99662
Dec. 28, 1990 [JP] Japan ................................. 2-416937
Dec. 28, 1990 [JP] Japan ................................. 2-416938

[51] Int. Cl.$^5$ ............................................. H04Q 7/00
[52] U.S. Cl. ................................. 455/33.1; 455/54.1; 455/56.1; 379/59
[58] Field of Search ............... 455/33.1, 33.2, 33.4, 455/38.1, 54.1, 54.2, 56.1, 89; 379/59, 60, 63

[56] References Cited

U.S. PATENT DOCUMENTS 4,775,999 10/1988 Williams ................................. 379/59
4,879,740 11/1989 Nagashima et al. ............... 379/60 X
5,101,500 3/1992 Marui ..................................... 455/33

OTHER PUBLICATIONS

Paper No. B-863, The Institute of Electronics, Information and Communication Engineers, Japan, 1989 Spring National Convention.

Primary Examiner—Reinhard J. Eisenzopf
Assistant Examiner—Chi Pham
Attorney, Agent, or Firm—Sughrue, Mion, Zinn, Macpeak & Seas

[57] ABSTRACT

A mobile communication system in which overlapping location areas are defined by radio base stations on an autonomous distribution basis. In a first embodiment, a mobile station registers the location thereof when moved in a radio zone which is not included in a location area notified by a radio base station and held therein. In a second embodiment, the mobile station registers the location when entered a radio zone in which location area being notified by the radio base station does not include the radio zone where the mobile station registered the location last. In a first and a second embodiment, the mobile station memorizes radio zones which it has passed after location registration as route information and may report the route information to a radio base station in the event of next location registration. The radio base station sequentially includes in the location area the radio zones which frequently appear in the route information. In a third embodiment, in response to a terminating call meant for the mobile station, a mobile switching center sends a calling signal meant for the mobile station to all of the radio base stations. In response, each radio base station effects calling if the own location area where it is situated is coincident with a location area included in the calling signal. In a fourth to a sixth embodiment, each radio base station measures the traffic of registration signals or that of calling signals so as to increase or decrease the number of radio zones included in the own location area in matching relation to the measured traffic.

10 Claims, 17 Drawing Sheets

| RADIO ZONE IDENTIFICATION | CUMULATIVE NUMBER |
|---|---|
| ZS1 | ZS1-COUNT |
| ZS2 | ZS2-COUNT |
| ⋮ | ⋮ |
| ZSx | ZSx-COUNT |
| ⋮ | ⋮ |

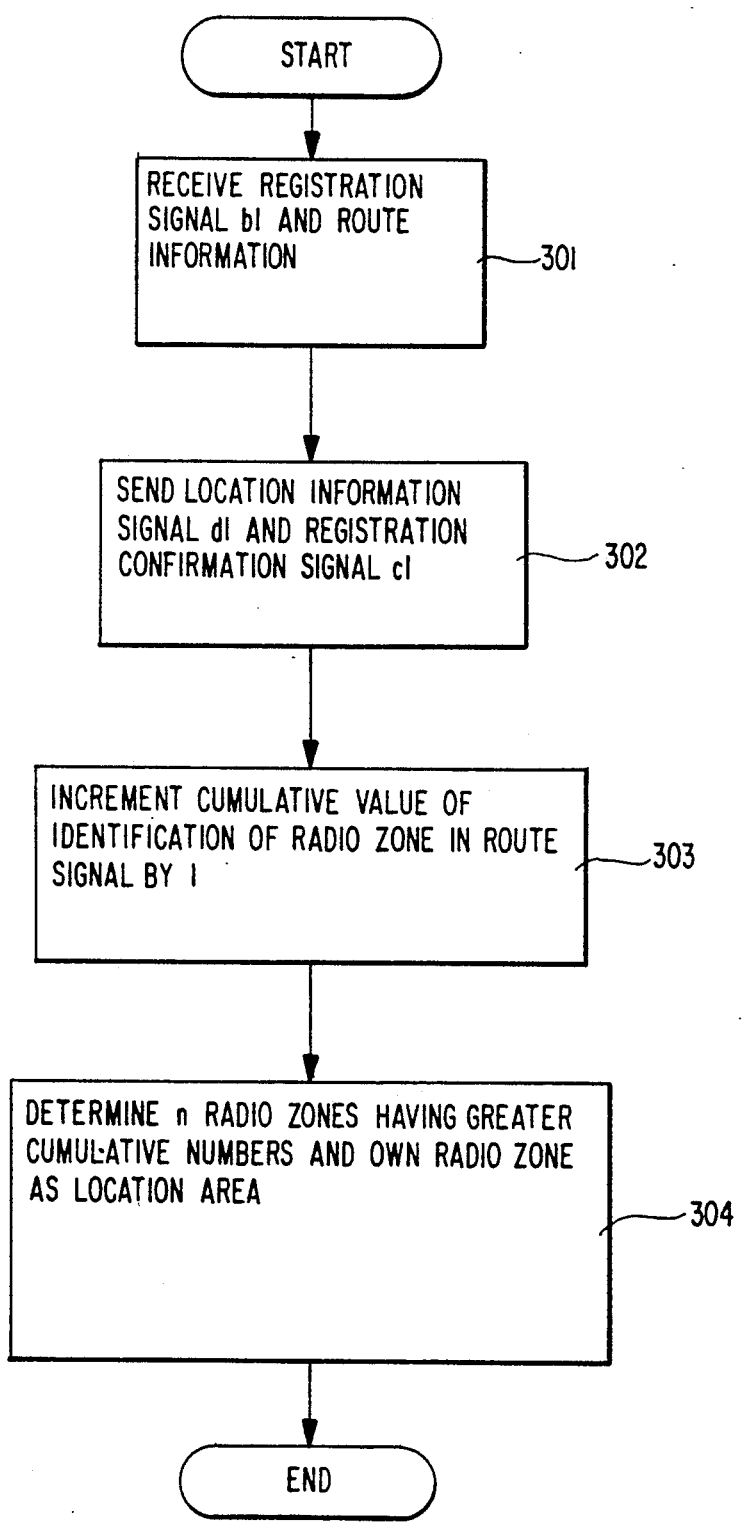

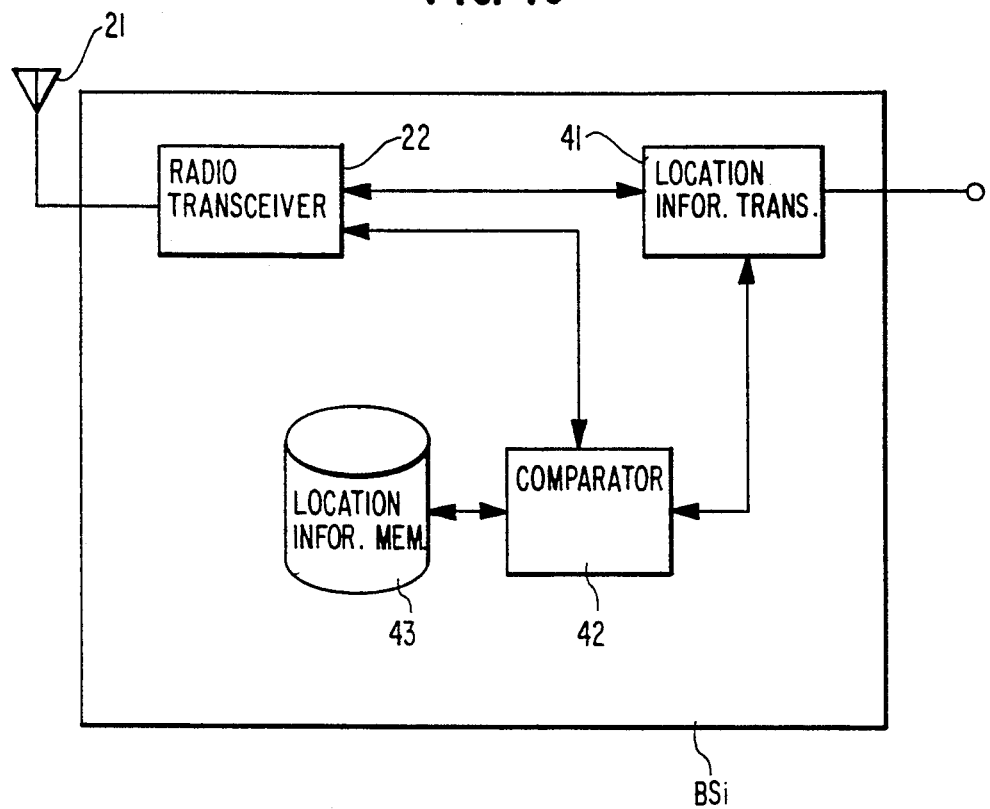

LOCATION REGISTRATION AND PAGING PROCEDURE FOR MOBILE COMMUNICATION

BACKGROUND OF THE INVENTION

1. Field of the Invention

The present invention relates to a location registration and paging procedure for mobile stations included in a mobile communication system and, more particularly, to a location registration and paging procedure for mobile stations each being movable in a plurality of radio zones in a mobile communication system which has overlapping location areas.

2. Description of the Prior Art

A conventional car telephone, portable telephone or similar mobile communication system is implemented with a miniature zone scheme in which the entire service area belonging to the system is covered by a plurality of radio zones. The term "radio zone" refers to a range in which each radio base station is communicable with a mobile station mounted on a car, for example, over a radio channel. A single radio base station is situated in each radio zone, and a plurality of mobile stations each is freely movable in the radio zones.

In a mobile communication system of the type using miniature zones as mentioned above, each mobile station has to register the location thereof to inform a radio base station of the current radio zone in which it exists. To avoid an increase in the traffic of exclusive control signals for location registration, it has been customary to divide the entire service area into sets of radio zones which neighbor each other to thereby define a plurality of location areas. A mobile station registers the location every time it is handed over from one location area to another. When a terminating call meant for a certain mobile station arrives, radio base stations situated in the location area where the mobile station has registered the location call the mobile station by broadcasting. Each location area is provided with an adequate size in consideration of the fact that including an excessively great number of radio zones therein would increase the calling traffic and thereby reduce the efficiency.

The way to divide the entire service area into a plurality of location registration areas may generally be classified into two kinds, i.e., one for non-overlapping location registration areas in which a radio zone belongs to a fixed location registration area and the other for overlapping location areas in which a radio zone belongs to a plurality of location registration areas.

Regarding the number, the non-overlapping location areas each has a relation of 1: n (natural number) to the radio zones belonging thereto, i.e., a radio zone is prevented from belonging to a plurality of location areas at the same time. In a mobile communication system, it sometimes occurs that a mobile station positioned in the vicinity of the border between nearby location areas moves across the border repetitively. In such a case, the non-overlapping location areas would result in the increase in the frequency of location registration of the mobile station and thereby cause the control signal traffic for location registration to center on radio base stations situated in the vicinity of the border.

The overlapping location areas eliminate the above problem. Specifically, if the duplication of radio zones in a first and a second location area is admitted, a mobile station does not have to register the location repetitively so long as it moves in the radio zones belonging to both of the first and second location areas. This is successful in preventing the control signal traffic from centering on particular radio base stations. To set up an overlapping location area, a set of a plurality of radio zones neighboring the lastest radio zone where a mobile station has registered the location may be defined as a second location area.

A specific method of setting up overlapping location areas was reported at THE INSTITUTE OF ELECTRONICS, INFORMATION AND COMMUNICATION ENGINEERS, JAPAN, 1989 SPRING NATIONAL CONVENTION, Paper No. B-863. This method sets up a location area on a radio zone basis by using two-dimensional positional coordinates particular to each radio base station.

Specifically, the above-mentioned method is such that when a mobile station has registered the location in a radio base station belonging to a given radio zone, it memorizes positional coordinates being notified by the radio base station. Every time the mobile station is handed over from one radio zone to another, it receives positional coordinates being notified by the radio base station situated in the new radio zone. When the mobile station enters a radio zone whose radio base station is situated at a predetermined distance R from the radio base station in which the mobile station has registered the location previously, it registers the location again.

However, the location area based on the coordinates of the radio base station in which a mobile station has registered the location has fixed topography with no regard to the position of the mobile station. This brings about a problem that even when a mobile station moves only one-dimensionally such as on a straight thruway, a location area including radio zones which the mobile station will not pass is set up.

BRIEF SUMMARY OF THE INVENTION

Objects of the Invention

A first object of the present invention is to provide a location registration and paging procedure applicable to a mobile communication system of the type using miniature zones and capable of reducing the exclusive control traffic for the location registration of mobile stations.

A second object of the present invention is to provide a location registration procedure capable of setting up a location area efficiently.

A third object of the present invention is to provide a location registration and paging procedure applicable to a mobile communication system of the type using miniature zones and capable of uniformizing the distribution of loads on apparatuses which constitute the system.

Summary of the Invention

In a mobile communication system in accordance with the present invention, the entire service area is covered by a plurality of radio zones each having a single radio base station. A plurality of mobile stations each freely moves in the radio zones and communicates with the radio base station belonging to the radio zone where it is located over a radio channel. Each radio bases station is connected generally to a public switched telephone network via a mobile switching center which governs a plurality of radio base stations. In this type of mobile communication system, each mobile station has to register the location thereof in the radio base station belonging to the radio zone where it exists by using a registration signal. The mobile switching center manages the information associated with the location of the mobile station by using a location area made up of a plurality of radio zones as a unit. The location area is configured as an "overlapping location area" which allows a given radio zone to belong to a plurality of location areas.

A location registration procedure of the present invention determines whether or not a mobile station entered a new radio zone should register the location there, depending on the location of the radio zone where it registered last. In accordance with the present invention, a location area is set up on the basis of route information sent from a mobile station.

In a preferred embodiment of the present invention, each radio base station sets up a location area including a plurality of radio zones and which is based on itself (sometimes referred to as the own location area hereinafter) and holds information representative of such a location area (referred to as location information hereinafter) in the form of identifications, for example. When a given radio base station receives a registration signal from a mobile station, it notifies the mobile station sent the registration signal of the location information. The mobile station memorizes the location information. When the mobile station has entered a new radio zone which is not included in the memorized location area, it registers the location in the radio base station belonging to the new radio zone.

A specific location area setting procedure particular to the present invention is as follows.

A mobile station records as route information the identification of a radio zone where it has registered the location thereof and the identifications of radio zones which it has passed after the location registration. In a radio zone which the mobile station has entered, the mobile station determines whether or not the identification of a radio zone being notified by a radio base station situated there is included in location information which the mobile station holds. If the result of decision is positive, the mobile station adds the identification of the radio zone to the route information. If otherwise, the mobile station registers the position thereof in the radio base station while reporting the route information to the latter.

The radio base station accumulates the identifications of individual radio zones included in the route information and sets a set of n (natural number) radio zones whose identifications are great in cumulative number and the own radio zone as a location area. The location area is sequentially updated in matching relation to the change in the cumulative numbers of the identifications. The latest location information is reported to a mobile station which has registered the location thereof in the own radio zone.

In another preferred embodiment of the present invention, each radio base station holds as a location area a plurality of radio zones in the form of radio zone identifications, for example, and notifies the own location information continuously. A mobile station registers a location on entering a radio zone whose location area does not include the identifications memorized radio zones.

A specific method of setting a location area which is a characteristic feature of the present invention is as follows.

A mobile station records as route information the identification of a radio zone where it registered the location and the identifications of radio zones which it has passed after the location registration. On entering a new radio zone, the mobile station determines whether or not the identification of the radio zone held therein and where the it has registered the location last is included in the location information which is being notified by the associated radio base station. If the result of decision is positive, the mobile station adds the identification of the new radio zone to the route information. If otherwise, the mobile station registers the location in the radio base station of the new radio zone while reporting the route information which it has held to the radio base station.

The radio base station accumulates the identifications of the individual radio zones included in the route information which is sent from the mobile station, and sets up a location area which is a set of n (natural number) radio zones whose identifications are great in cumulative number and the own radio zone. The radio base station sequentially updates the location area in matching relation to the change in the cumulative numbers of the identifications. The latest location information is notified to the mobile station existing in the own radio zone.

In accordance with the present invention, each radio base station determines the own location area on an autonomous distribution basis. The communication system, therefore, realizes overlapping location areas and thereby eliminates the concentration of registration traffic ascribable to frequent registration in radio zones which are located at the border between nearby location areas. The radio base stations each learns the route information sent from a mobile station having registered the location there and, therefore, sets up an efficient location area by taking account of a course which the mobile station will take. This frees the mobile station from frequent location registration.

In a paging procedure of the present invention, the mobile switching center holds the identifications of mobile stations existing in the radio zones of the radio base stations which it governs and location information of mobile stations having registered locations, in the form of radio zone identifications. When a terminating call (paging) meant for a certain mobile station arrives, the mobile switching center locates a particular radio zone where the mobile station has registered the location. Then, the mobile switching center sends a paging signal including the location area of the mobile station of interest to all of the radio base stations which it supervises by broadcasting. In response, the radio base stations each calls the mobile station existing in the own radio zone if the location area thereof is included in the reported location area.

The radio base stations each holds own location information. On receiving the paging signal from the mobile switching center sent by broadcasting, the radio base station compares it with location information which it holds. If the location area included in the calling signal includes the identification of the radio zone of the location information, the radio base station executes calling in the own radio zone.

The paging method of the present invention allows a mobile station having registered the location to be called without fail in all of the radio zones which it pass without registration. This makes it needless for the mobile switching center to hold information representative of location areas each being based on a particular radio base station.

Preferably, each radio base station increases or decreases the number of radio zones belonging to the own location area in conformity to the traffic of calling signals which it sends to mobile stations or in conformity to the traffic of paging signals which it receives from the mobile switching station. Alternatively, the radio base station may increase or decrease the own location area in conformity to the traffic of calling signals or the traffic of registration signals. Specifically, when the traffic of calling signals sent from the radio base station to mobile stations exceeds a predetermined amount, the radio base station reduces the number of radio zones belonging to the own location area. When the traffic of registration signals sent from the mobile stations to the radio base station exceeds a predetermined amount, the radio base station increases the number of radio zones belonging to the own location area. Each radio base station, therefore, can increase or decrease the own location area in matching relation to the traffic. Consequently, the mobile communication system equally distributes the processing of calling signal traffic and registration signal traffic to all of the radio base stations. This eliminates the increase in the delay of connection between mobile stations and radio base stations and prevents the calling signal traffic and registration signal traffic from obstructing other control signals.

BRIEF DESCRIPTION OF THE DRAWINGS

The above-mentioned and other objects, features and advantages of the present invention will become more apparent by reference to the following detailed description of the invention taken in conjunction with the accompanying drawings, wherein:

FIG. 10 is a flowchart demonstrating a specific location registering operation of the radio base station shown in FIG. 7;

FIG. 16 is a block diagram schematically showing a specific construction of a radio base station particular to the third embodiment;

FIG. 17 shows specific data registration data held by a mobile switching center included in the third embodiment;

DETAILED DESCRIPTION OF THE PREFERRED EMBODIMENTS

Figure 1:
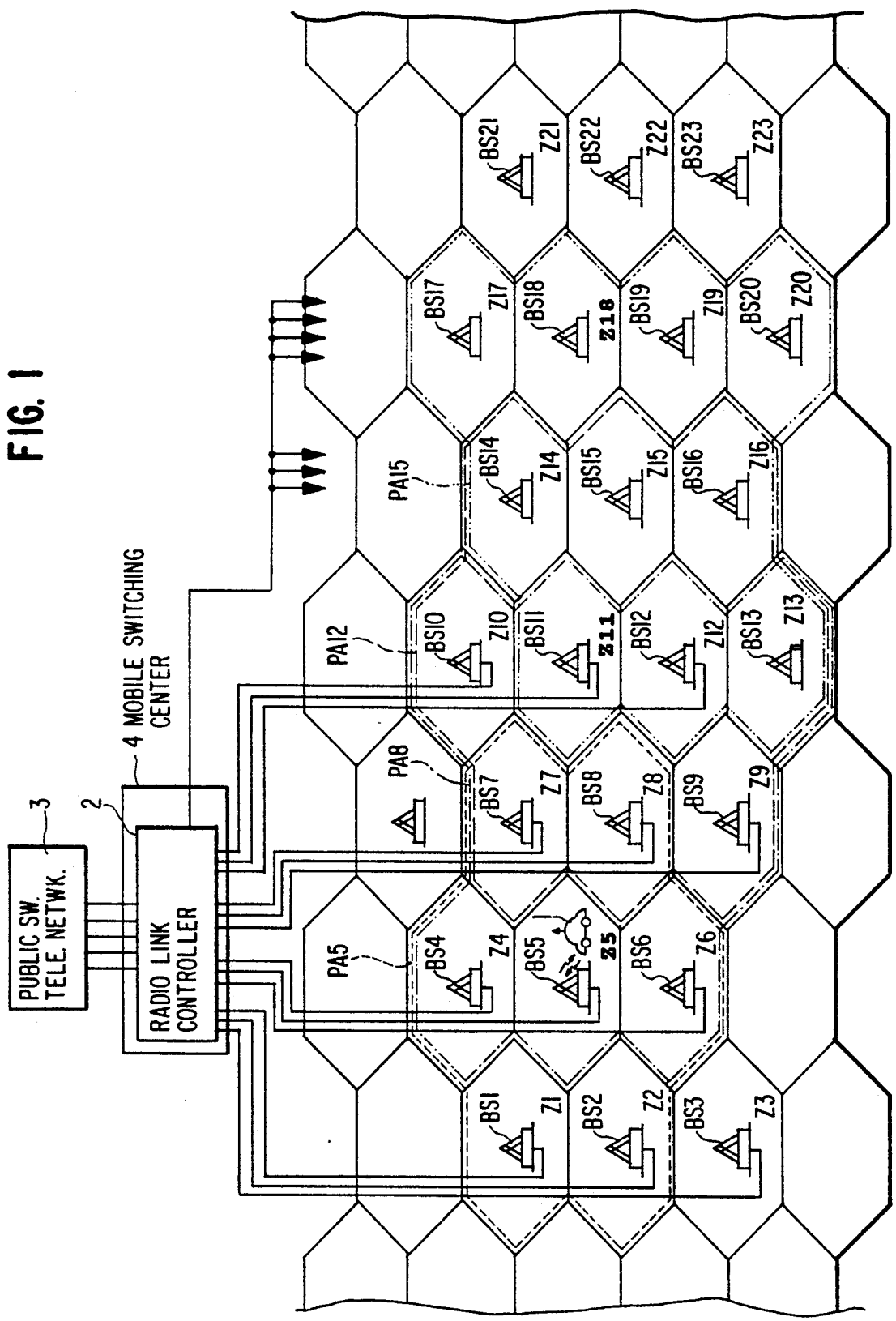
FIG. 1 is a diagram showing the construction of a mobile communication system to which the present invention pertains.

Referring to FIG. 1 of the drawings, a mobile communication system to which the present invention pertains has a plurality of radio zones $Z_i$ (Z1 to Z23 in the figure), a plurality of radio base stations $BS_i$ (BS1 to BS23 in the figure), a mobile station 1, a radio link controller 2, and a public switched telephone network 3. The radio link controller 2 forms part of a mobile switching center 4. Let the suffixes i of the radio zones $Z_i$ and radio base stations $BS_i$ be natural numbers. The symbols without such suffixes designate all of the radio zones and all of the radio base stations, including symbols which will appear. The radio base stations $BS_i$ each is situated in respective one of the radio zones $Z_i$. Each radio zone $Z_i$ and the associated radio base station $BS_i$ share the same number. The mobile station 1 is representative of a plurality of mobile stations which are mounted on cars, for example. The mobile station 1 is freely movable in all of the radio zones Z. The radio link controller 2 is connected to the public switched telephone network 3 and all of the radio base stations BS which it governs, thereby controlling the individual radio base stations BS. The mobile communication system is implemented with a miniature zone system wherein the plurality of radio zones Z cover the entire service area.

Assuming that the system shown in FIG. 1 adopts conventional non-overlapping location areas, the radio zones Z1 to Z9 and the radio zones Z10 to Z18, for example, are permanently assigned to a first and a second location area. Assume that the mobile station 1 repetitively moves across the border between the first and second location areas, e.g., between the radio zones Z8 and Z11. Then, there arises a problem that the frequency of location registration is increased to cause the control signal traffic for location registration to center on the radio base stations Z8 and Z11.

Figure 2:
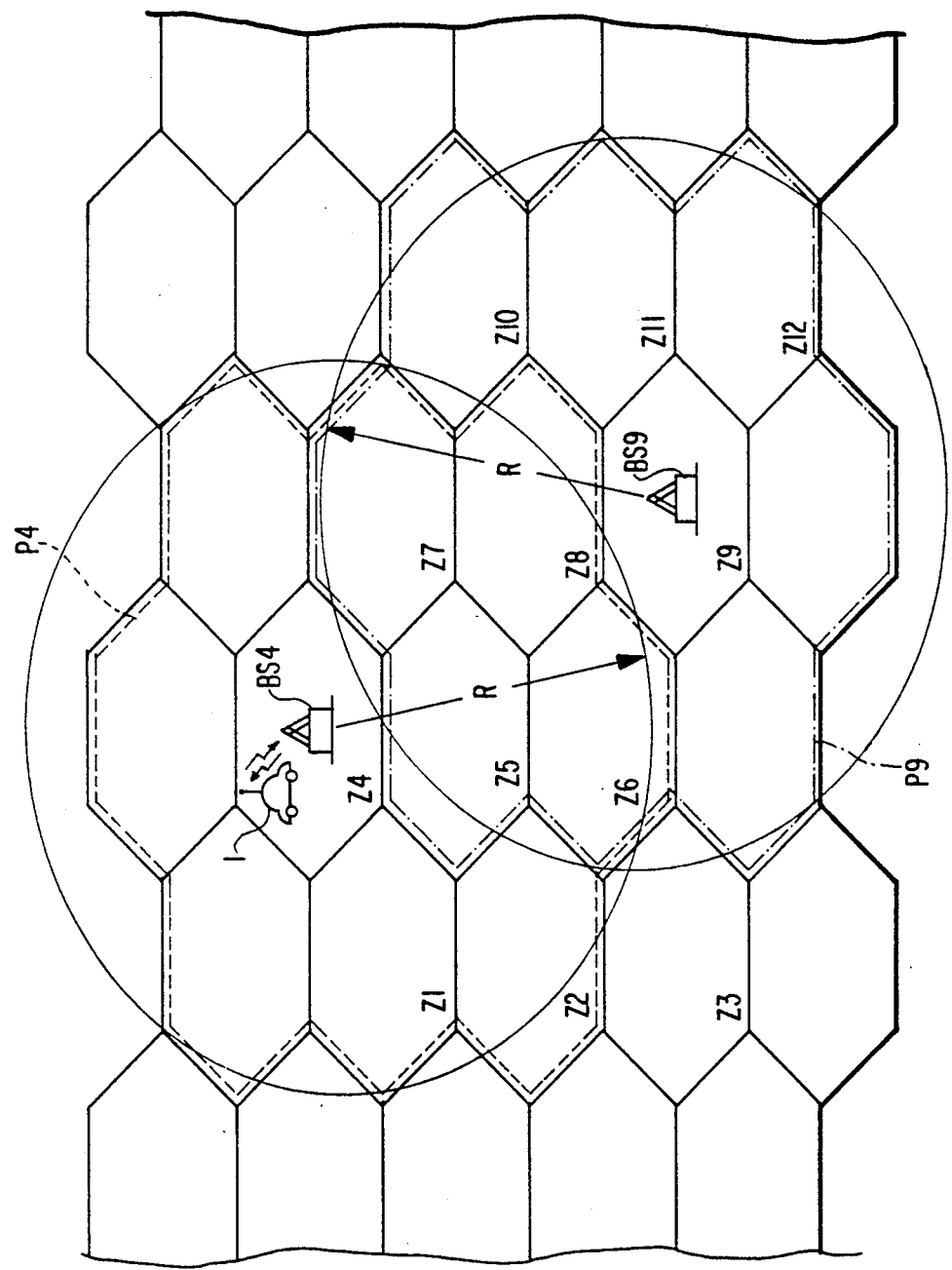
FIG. 2 is a diagram representative of a conventional location registration procedure of the kind having overlapping location areas.

FIG. 2 shows specific location areas P4 and P9 having respectively the radio zones Z4 and Z9 at the center thereof. These areas P4 and P9 each is constituted by radio zones existing in a circle having a predetermined radius R as measured from the radio base station BS4 or BS9 which belongs to the center radio zone Z4 or Z9. Specifically, the location area P4 includes the radio zones Z1, Z2, Z4, Z5, Z6, Z7 and Z8, while the location area P9 includes the radio zones Z5, Z6, Z7, Z8, Z9, Z10, Z11 and Z12. In such an area assignment, both of the location areas P4 and P9 include the radio zones Z5 to Z8. The location of the mobile station 1 moving in the service areas is registered in each radio zone $Z_i$ on the basis of two-dimensional positional coordinates of the radio base station $BS_i$ belonging to the radio zone $Z_i$ (THE INSTITUTE OF ELECTRONICS, INFORMATION AND COMMUNICATION ENGINEERS, JAPAN, 1989 SPRING NATIONAL CONVENTION, Paper No. B-863).

Figure 3:
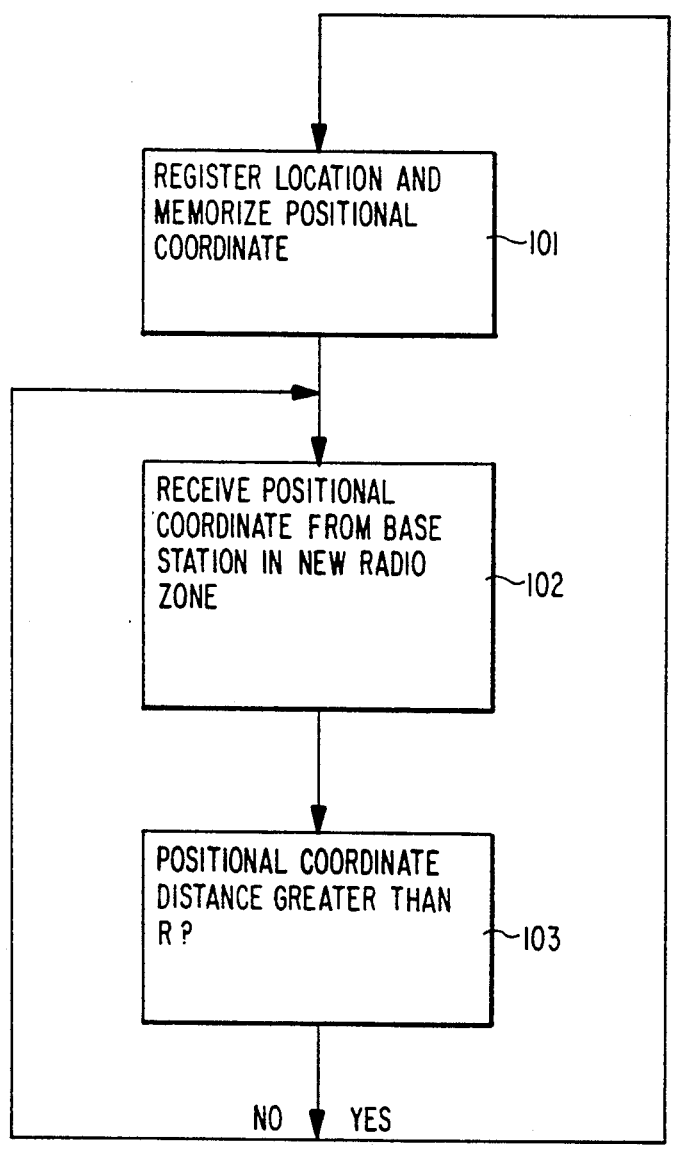
FIG. 3 is a flowchart showing a location registration procedure particular to a mobile station included in the conventional system having overlapping location areas.

Referring to FIG. 3, a specific location area setting procedure available with the conventional system shown in FIG. 2 will be described. The mobile station 1 registers the location thereof in a given radio base station $BS_i$, e.g., the radio base station BS4 situated in the radio zone Z4 and memorizes positional coordinates being notified by the base station BS4 (step 101). Every time the mobile station 1 moves from one radio zone $Z_i$ to another, it receives coordinates being sent from the radio base station $BS_i$ located in the new radio zone $Z_i$ (step 102). Then, the mobile station 1 calculates the distance between the radio base station BS4 and the new radio base station $BS_i$ in terms of the coordinates and determines whether or not the distance is greater than the predetermined distance R (step 103). If the result of decision is positive, e.g., when the mobile station 1 has entered the radio zone Z9 and is receiving the coordinates of the radio base station BS9, the program returns to the step 101. Then, the mobile station 1 registers the location thereof in the radio base station BS9 while memorizing the coordinates of the radio zone Z9.

However, the location area $P_i$ defined on the basis of the coordinates of the radio base station $BS_i$ in which the mobile station 1 has registered the location includes a regular circle having the radius R with no regard to the location of the mobile station 1. As a result, even when the mobile station 1 moves only one-dimensionally such as on a straight thruway, a location area $P_i$ including radio zones $Z_i$ which the station 1 will never pass is set up.

Referring again to FIG. 1, location areas PA5, PA8, PA12 and PA15 in accordance with the present invention each covering some radio zones $Z_i$ are shown. These areas PA5, PA8, PA12 and PA15 have respectively the radio zones Z5, Z8, Z12 and Z15 as their reference points. Assume that the location area PA5 has seven radio zones Z1, Z2, Z4, Z5, Z6, Z7 and Z8, the location area PA8 has ten radio zones Z4, Z5, Z6, Z7, Z8, Z9, Z10, Z11, Z12 and Z13, the location area PA12 has ten radio zones Z7, Z8, Z9, Z10, Z11, Z12, Z13, Z14, Z15 and Z16, and the location area PA15 has ten radio zones Z11, Z12, Z13, Z14, Z15, Z16, Z17, Z18, Z19 and Z20. The mobile station 1 registers the location thereof and is called by broadcasting on the area $PA_i$ basis.

Figure 4:
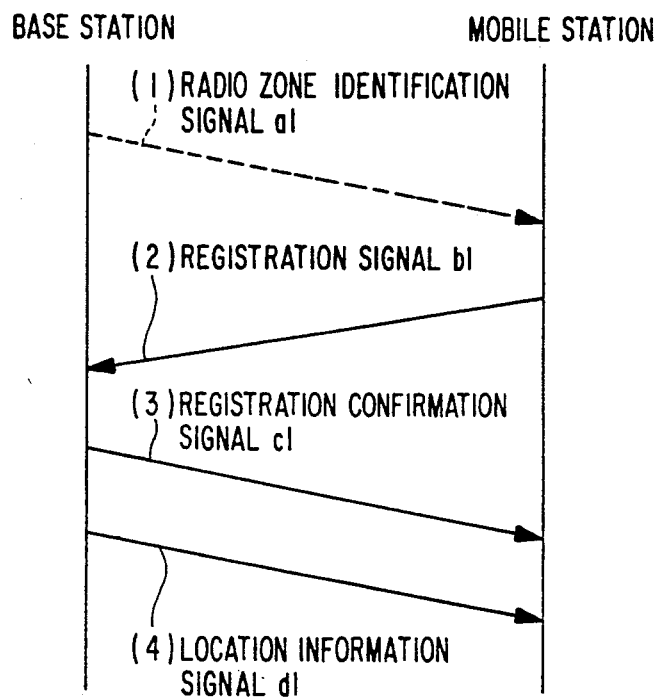
FIG. 4 is a diagram showing a sequence of signals which are interchanged for location registration between a radio base station and a mobile station in a first embodiment of the present invention.

A reference will be made to FIGS. 1 and 4 for describing the interchange of signals which is effected between the radio base station $Z_i$ and the mobile station 1 for registering the location.

The mobile station 1 receives a radio station identification (ID) code included in a radio zone ID signal a1 which is being sent from, for example, the radio base station BS5 situated in the radio zone Z5 (1). The radio station ID code will sometimes be referred to as an identification $ZS_i$ for identifying the radio zone $Z_i$ and is the identification ZS5 in this case. When the mobile station 1 determines that its location has to be registered, it sends a registration signal b1 to the base station BS5 (2). On receiving the registration signal b1, the base station BS5 sends a registration confirmation signal c1 to the mobile station 1 to confirm that the registration signal b1 has been receive (3). At the same time, the base station BS5 sends to the mobile station 1 a location information signal d1 which is a sequence of identifications $ZS_i$ (radio base station ID codes) representative of the radio zones $Z_i$ that are included in the location area PA5 whose reference is the radio zone Z5 (4). In response, the mobile station 1 memorizes the set of identifications $ZS_i$ included in the location information signal d1. Thereafter, as the mobile station 1 moves to the radio zone Z12, for example, it receives an identification ZS12 assigned to the radio zone Z12 (1). Then, since the identification ZS12 is a radio base station ID code not included in the previously received location information signal d1, the mobile station 1 again performs the location registering operation (2).

Figure 5:
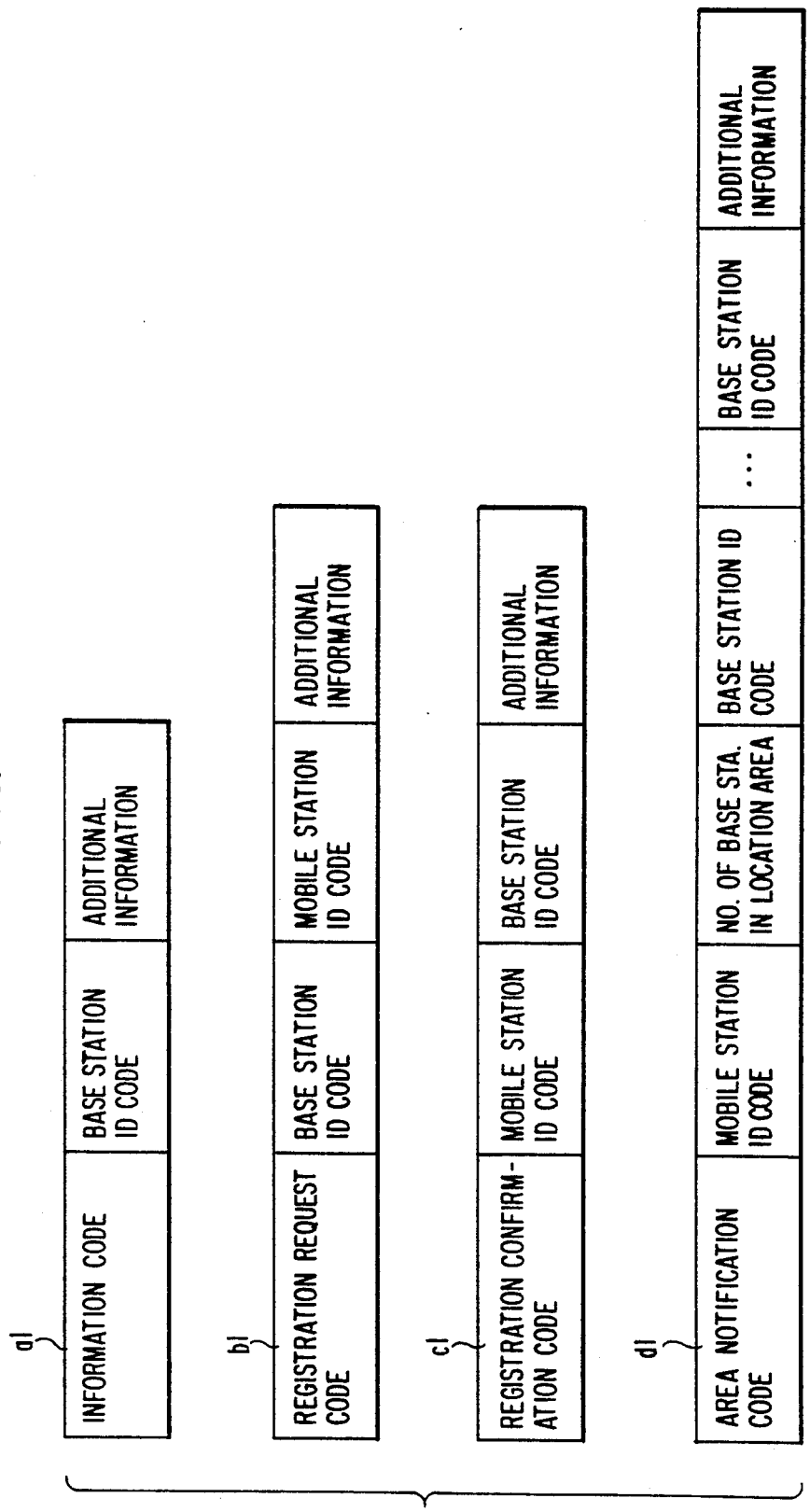
FIG. 5 shows specific formats of signals indicated in FIG. 4.

FIG. 5 shows specific formats of the above-stated signals a1, b1, c1 and d1. As shown, the radio zone ID signal a1 is made up of an information code indicating that the signal a1 is a notifying signal, a radio base station ID code (identification $ZS_i$ of radio zone $Z_i$) indicating the transmitting radio base station $BS_i$, and additional information such as the geographical conditions of the transmitting station $BS_i$. The registration signal b1 is constituted by a registration request code indicating that the signal b1 is a registration signal, a radio base station ID code representative of the radio base station to communicate with the mobile station 1, an ID code assigned to the transmitted mobile station 1, and additional information indicative of the type and other factors particular to the mobile station 1. Route information indicative of the route which the mobile station 1 has travelled is also sent as part of the additional information of the signal b1 or as an independent signal. The registration confirmation signal c1 is constituted by a registration confirmation code showing that the signal c1 is a registration confirmation signal, a mobile station ID code representative of the mobile station 1, a base station ID code representative of the transmitted radio base station, and additional information. Further, the location information signal d1 is made up of an area notification code showing that the signal d1 is a location information signal, a mobile station ID code for identifying the mobile station 1, the number of radio base stations included in the location area of interest, a plurality of radio base station ID codes representative of such radio base stations, and additional information. The location information signal d1 may be sent as part of the additional information of the registration confirmation signal c1.

A specific operation of a first embodiment of the present invention will be described with reference to FIGS. 1, 4 and 5.

When the power source of the mobile station 1 is applied in the radio zone Z5, the mobile station 1 sends a registration signal b1 in the radio zone Z5 for registering the location thereof. On registering the position of the mobile station 1, the radio base station BS5 situated in the radio zone Z5 sends to the mobile station 1 a registration confirmation signal c1 and a location information signal d1, i.e., a signal including radio base station ID codes (identifications ZS1, ZS2, ZS4, ZS5, ZS6, ZS7 and ZS8) designating the radio zones Z1, Z2, Z4, Z5, Z6, Z7 and Z8 that lie in the location area PA5. In response to the signal d1, the mobile station 1 memorizes the plurality of radio zones Zi lying in the location area PA5 as, for example, identifications Zsi. Assume that the mobile station moves from the radio zone Z5 to the radio zone 12 by way of the radio zone Z8. When the mobile station 1 is handed over from the radio zone Z5 to the radio zone Z8, it does not register the location thereof since the radio zone Z8 which will be notified by a radio zone ID signal a1 is included in the location information signal d1 received in the radio zone Z5. However, when the mobile station 1 is handed over from the radio zone Z8 to the radio zone Z12, it has to register the location thereof by use of the registration signal b1 since the radio zone Z12 which will be reported by a radio zone ID signal a1 is not included in the memorized location information signal d1. After the mobile station 1 has registered its location in the radio zone Z12, it memorizes the location area PA12 represented by a new location information signal d1 which will be received together with a registration confirmation signal c1. Such unique location area PAi setting and registration procedure is advantageous in that even when the mobile station 1 enters the radio zone Z8 again immediately after the registration in the radio zone Z12, it does not have to register the location again in the radio zone Z8 since the identification ZS8 designating the radio zone Z9 exists in the location information signal d1 received in the radio zone Z12.

Figure 6:
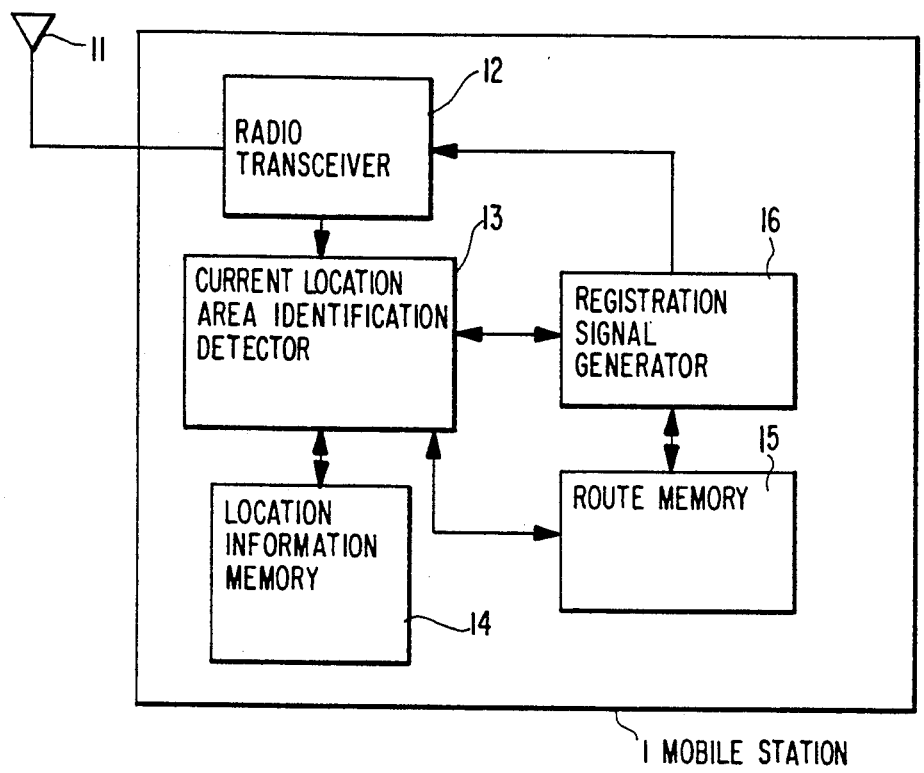
FIG. 6 is a block diagram schematically showing a specific construction of the mobile station of the first embodiment.

A specific construction of the mobile station 1 is shown in FIG. 6 and includes an antenna 11, a transceiver 12, a current location area identification detector 13, a location information memory 14, a route memory 15, and a registration signal generator 16.

The antenna 11 and transceiver 12 set up a radio channel between the mobile station 1 and the radio base station BSi to allow them to interchange various signals. The current location area identification detector 13 has a function of detecting a radio zone identification ZSi on the basis of the radio zone ID signal a1 and location information signal d1 received by the transceiver 12. Also, the detector 13 has three different control functions, i.e., a function of comparing the detected identification ZSi with route data having been stored in the location information memory 15 (i.e. set of radio zones Zi which the mobile station 1 has passed after the last registration), a function of comparing the detected identification ZSi with location information having been stored in the location information memory 14 (i.e. set of identifications ZSi of radio zones Zi included in the location area signal which was stored at the time of last registration), a function of writing the detected identification ZSi in the location information memory 14 or the route memory 15, and a function of commanding the registration signal generator 16 to send a registration signal b1. The registration signal generator 16 delivers a registration signal b1 and route information to the transceiver 12.

Figure 7:
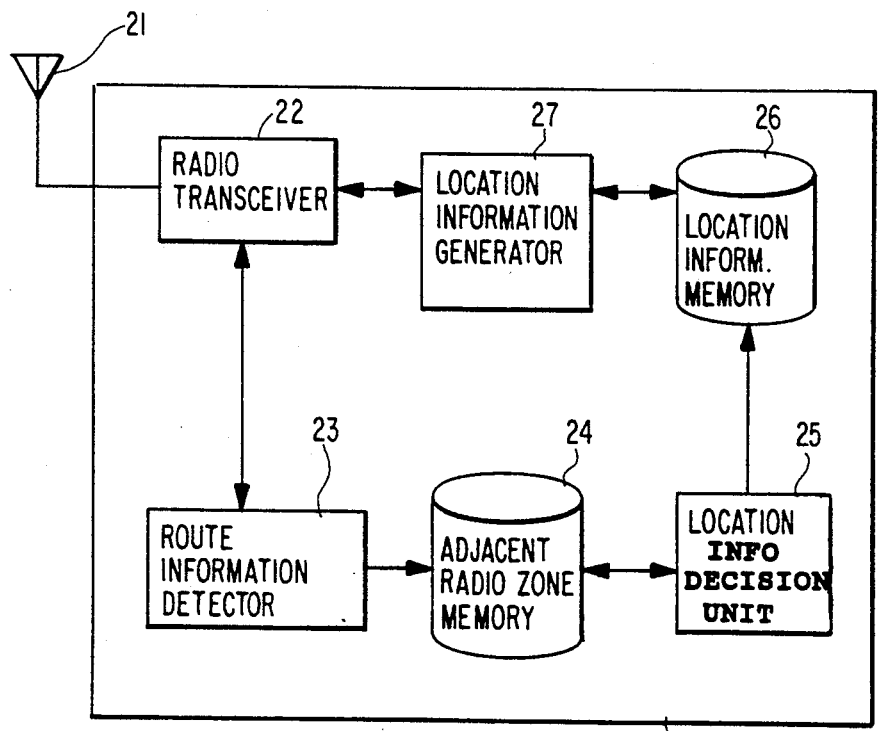
FIG. 7 is a block diagram schematically showing a specific construction of the radio base station of the first embodiment.

Referring to FIG. 7, a specific construction of the radio base station BSi which is associated with the construction of FIG. 6 is shown. As shown, the radio base station BSi includes an antenna 21, a transceiver 22, a route information detector 23, an adjacent radio zone memory 24, a location information decision unit 25, a location information memory 26, and a location information generator 27.

The antenna 21 and transceiver 22 establishes a radio channel between the radio base station BSi and the mobile station 1 for the interchange of signals. The route information detector 23 detects route information included in the registration signal b1 which the transceiver 22 has received, and updates data stored in the adjacent radio zone memory 24. The adjacent radio zone memory 24 has a counter for cumulatively counting the number of times that the identification ZSi has appeared for each of the plurality of radio zones Zi included in the route information. The resultant frequency information is used as original data for defining a location area PA1 whose reference is the radio base station BSi. The location information decision unit 25 sequentially selects, among the identifications ZS accumulated in the adjacent radio zone memory 24, n identifications ZS having greater numbers and determines a set of the n identifications ZS and the own station's radio zone Zi as a new location area PAi. The latest location area PAi so determined by the decision unit 25 is written to the location information memory 26 in the form of a set of identifications ZSi of radio zones Zi. In the event of transmission of a registration confirmation signal c1, the location information generator 27 reads the location information out of the memory 26. Then, a location information signal d1 including the location information is sent to the mobile station 1 via the transceiver 22 and antenna 21.

Figures 8, 13:
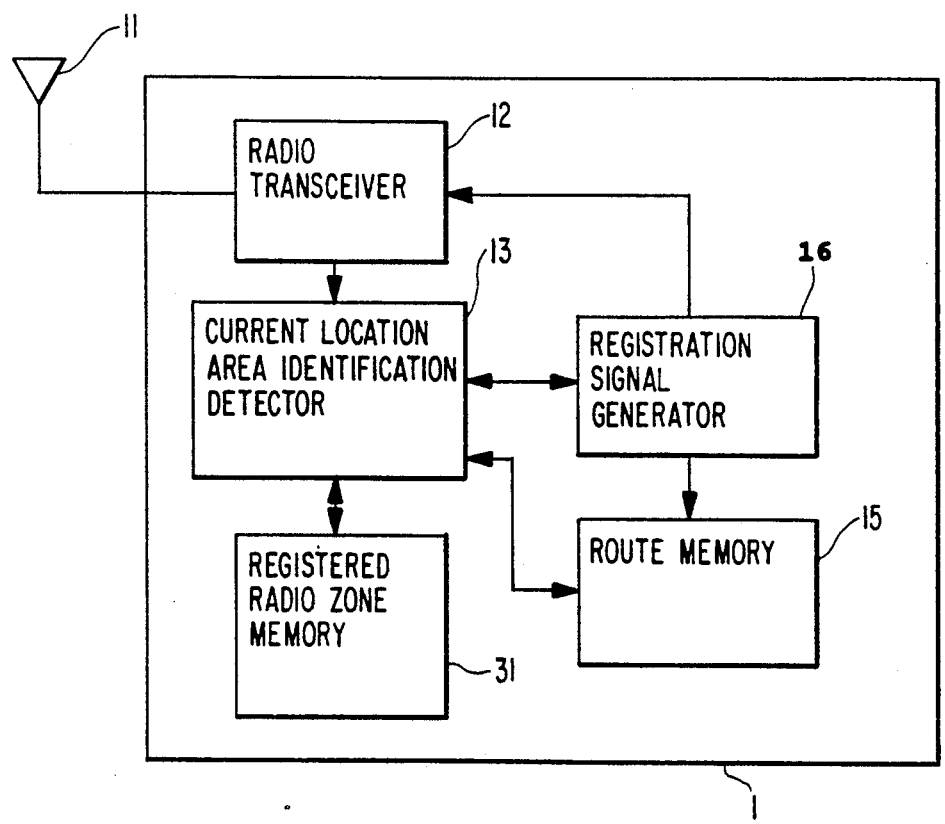
FIG. 8 is a table showing specific data associated with the identifications of radio zones held by a radio base station in accordance with the present invention.
FIG. 13 is a block diagram schematically showing a specific construction of the mobile station of the second embodiment.

FIG. 8 shows a specific data base assigned to identifications ZSx (x being a natural number) of radio zones Zx which are detected out of the route information sent from the mobile station 1 and written to the counter of the adjacent radio zone memory 24. As shown, the data base consists of two different recordings, i.e., radio zone identifications ZSx and cumulative numbers Zx-count each being associated with respective one of the identifications ZSx. The data base memorizes the cumulative numbers of radio zones which a plurality of mobile stations have passed after the last location registration in radio zones Zx. Specifically, the table indicates that, among mobile stations having registered their locations in the radio base station BSi having the data base, Zx-count mobile stations have passed a radio zone Zx indicated by an identification ZSx after the last location registration.

Figure 9:
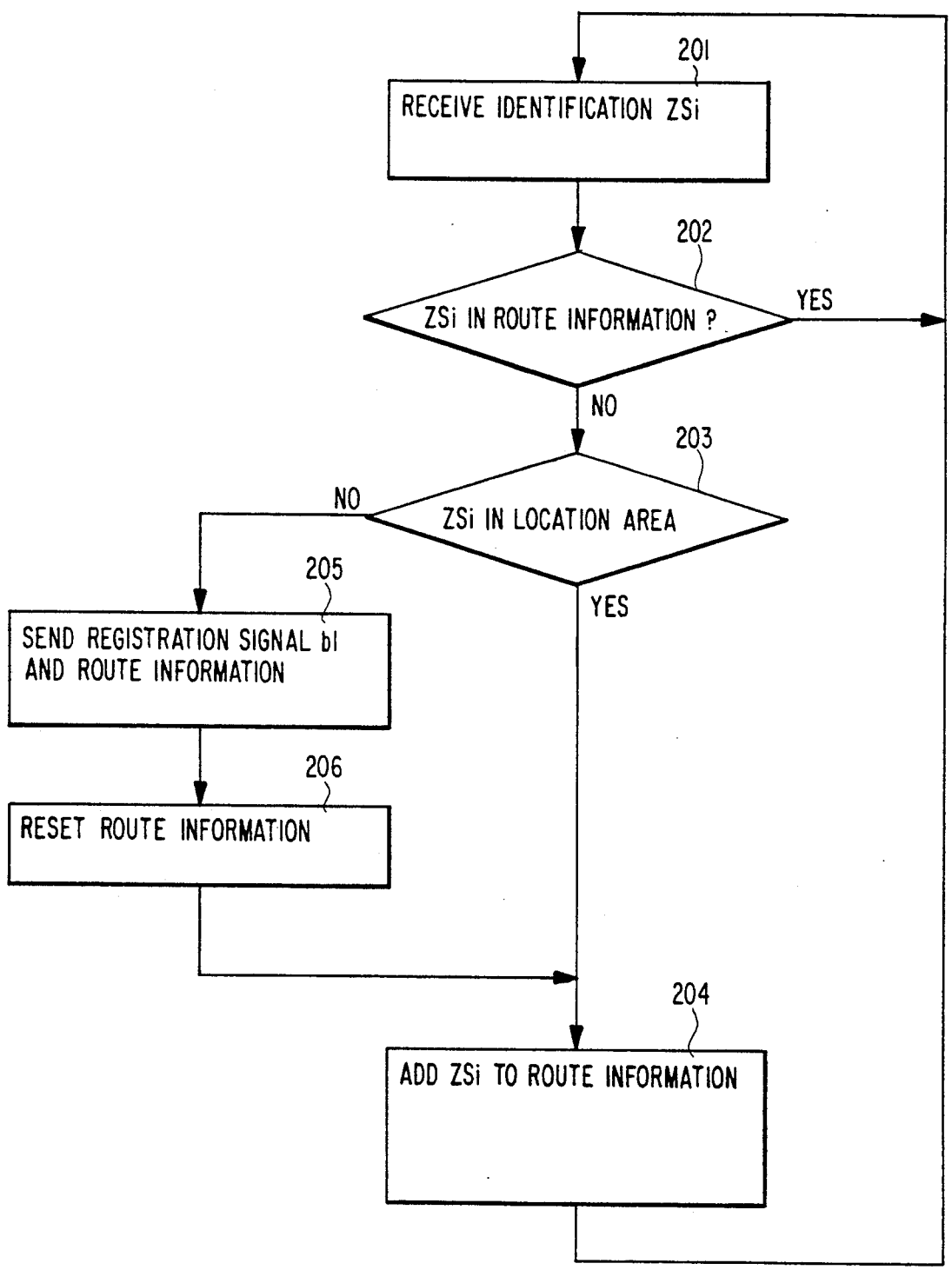
FIG. 9 is a flowchart demonstrating a specific location registering operation of the mobile station shown in FIG. 6.

The operation of the mobile station shown in FIG. 6 will be described with reference to FIGS. 1 and 9.

The radio zone ID signal al being generated by the radio base station BSi comes in the mobile station 1 through the antenna 11 and transceiver 12. In response, the current location area identification detector 13 detects the identification ZSi of the radio zone Zi out of the radio zone ID signal al (step 201). Then, the detector 13 determines whether or not the detected identification ZSi is included in the route information existing in the route memory 15 (step 202). If the answer of the step 202 is YES, the program simply returns to the step 201. If the answer of the step 202 is NO, the detector 13 determines whether or not the detected identification ZSi is included in the location information stored in the location information memory 14 and received from a radio base station at the time of last registration (step 203). If the answer of the step 203 is YES, the detector 13 adds the identification ZSi of the radio zone Zi to the route information stored in the route memory 15 (step 204), and the program returns to the step 201. If the answer of the step 203 is NO, the detector 13 commands the registration signal generator 16 to send a registration signal b1. In response, the registration signal generator 16 reads the set of identifications ZSi out of the route memory 15 as route information, includes it in the additional information to generate a registration signal, and then sends the registration signal to the radio base station Zi via the transceiver 12 and antenna 11 (step 205). The detector 13 once resets the route information stored in the route memory 15 (step 206), adds the identification ZSi of the radio zone Zi where the mobile station exists to the route information (step 204), and then returns to the step 201. In this manner, the mobile station 1 shown in FIG. 6 travels while generating route information representative of radio zones Zx which it passed.

A reference will be made to FIGS. 1 and 10 for describing the operation of the radio base station BSi shown in FIG. 7. The radio base station BSi continuously transmits the identification ZSi of the own radio zone Zi via the antenna 21. The base station BSi receives the registration signal b1 and route information included therein from the mobile station 1 by the antenna 21 and transceiver 22 thereof (step 301). As the registration signal b1 is fed from the transceiver 22 to the location information generator 27, the generator 27 reads out of the location information memory 26 the information of the location area PAi which has already been set on the basis of the own radio zone Zi, and then generates a location information signal d1. The location information signal d1 is sent to the mobile station 1 having transmitted the registration signal b1 together with a registration confirmation signal c1 by the way of the transceiver 22 and antenna 21 (step 302). The registration signal b1 is fed from the transceiver 22 to the route information detector 23 as well. In response, the detector 23 increments the cumulative value of the identification ZSx of the radio zone Zx included in the received route information on the identification ZS counter of the adjacent radio zone memory 24 (step 303).

The location information decision unit 25 determines, among the radio zones Zx stored in the adjacent radio zone memory 24, n radio zones Zx having greater cumulative numbers and the own station's radio zone ZSi as a location area PAi. Here, n is a suitable natural number and may be selected by the individual radio base stations BSi. The determined location area PAi is written to the location information memory 26 as the latest location information (step 304).

As stated above, the radio base station BSi shown in FIG. 7 holds route information which is cumulative values associated with the identifications ZS of a plurality of radio zones Z, and determines a location area PAi whose reference is the own radio zone Zi on the basis of the route information.

Referring again to FIG. 1, how the illustrative embodiment including the mobile station 1 and radio base station BSi shown in FIGS. 6 and 7, respectively, generates route information will be described.

Assume that the mobile station 1 having registered the location thereof in the radio zone Z5 travels from the radio zone Z5 to the radio zone Z12 by way of the radio zone Z8. Just after the registration in the radio zone Z5, the mobile station 1 holds PA5 as a location area in the location information memory 14 and the identification ZS5 of the radio zone Z5 as route information route memory 15. So long as the mobile station 1 travels in the radio zone Z5, it continuously receives the identification ZS5 of the radio zone Z5. Since the route information held in the memory 14 includes the identification ZS5, the mobile station 1 does not execute any processing with the identification Z5 and simply waits for the identification ZSi of another radio zone Zi. On entering the radio zone Z8 next to the radio zone Z5, the mobile station 1 receives the identification ZS8 of the radio zone Z8 being generated by the radio base station BS8. Since the identification ZS8 is absent in the route information held in the mobile station 1, the station 1 determines whether or not the radio zone Z8 exists in the location area PA5 stored therein. In this case, the identification ZS8 is included in the location area PA5 held in the mobile station 1, so that the station 1 adds the identification ZS8 to the route information, i.e., produces route information (ZS5, ZS8) and again awaits the identification ZSi of another radio zone Zi. On entering the radio zone Z12 next to the radio zone Z8, the mobile station 1 registers its location in the radio base station BS12 of the radio zone Z12 since the identification ZS12 which will be detected out of the radio zone ID signal a1 does not exist in the route information or the location area PA5 stored in the station 1. At this instant, the mobile station 1 sends a registration signal b1 and the radio zone identification or route information (ZS5, ZS8) to the radio base station BS12 of interest. Then, the mobile station 1 once resets the route information, adds Z12 to route information to hold (ZS12), and then waits for the identification ZSi of a radio zone Zi.

On receiving the registration signal b1 and route information (ZS5, ZS8) included therein, the radio base station BS12 sends to the mobile station 1 a registration confirmation signal c1 and information representative of a location area PA12 based on the own radio zone Z12, i.e., a location information signal d1. Subsequently, the radio base station BS12 increments the cumulative numbers of identifications ZS5 and ZS8 included in the received route information by one, selects n radio zones having greater cumulative values, and then defines a new location area PA12 on the basis of the n radio zones and the own radio zone Z12. In this particular embodiment, the number n of radio zones Z, except for the own radio zone Z12, belonging to the location area PA12 is nine.

The embodiment having the mobile station 1 and radio base station BSi shown in FIGS. 6 and 7, respectively, have various advantages, as follows. The radio base stations BSi each is capable of setting up a particular location area PAi in response to route information sent from the mobile station 1 which has registered its location in the own radio zone Zi, implementing location area PA which overlap each other. Each radio base station BSi sets a location area PAi by taking account of how the mobile station 1 leaving the radio zone Zi where it has registered the location will move, whereby a location area is set up efficiently without resorting to frequent registration. Furthermore, the radio base station BSi defines a location area PAi on the basis of the radio zone Zi where the mobile station 1 has registered its location. This eliminates frequent registration which would otherwise occur in the vicinity of conventional nearby location areas P that do not overlap each other, and prevents the control traffic for registration from centering on particular radio base stations BS existing in the vicinity of the border between nearby location areas.

Figure 11:
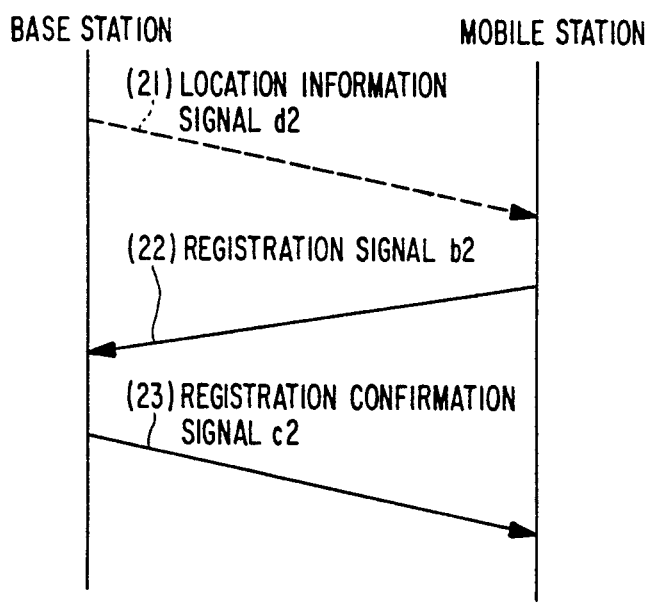
FIG. 11 is a diagram showing a sequence of signals interchanged for location registration between a radio base station and a mobile station in a second embodiment of the present invention.

Referring to FIGS. 1 and 11, a signal interchange sequence between the radio base station BSi and the mobile station 1 representative of a second embodiment of the present invention will be described.

The mobile station 1 receives a location information signal d2 being generated by, for example, the radio base station BS5 situated in the radio zone Z5 and including a sequence of ID codes representative of radio base stations, i.e., identifications ZS of radio zones which are covered by the location area PA5 (21). When the mobile station 1 determines that it has to register the location thereof, it sends a registration signal b2 to the base station BS5 (22). On receiving the signal b2, the base station BS5 transmits a registration confirmation signal c2 to the mobile station 1. In response, the mobile station 1 memorizes the identification ZA5 of the radio zone Z5 in which it has registered the location. In another radio zone Zi next to the radio zone Z5, the mobile station 1 compares the identifications ZS of radio zones Z included in a location information signal d2 being generated there with the identification ZS5 of the radio zone Z5. Only if the identification ZS5 is not included in the location information signal d2, the mobile station 1 registers the location thereof.

Figure 12:
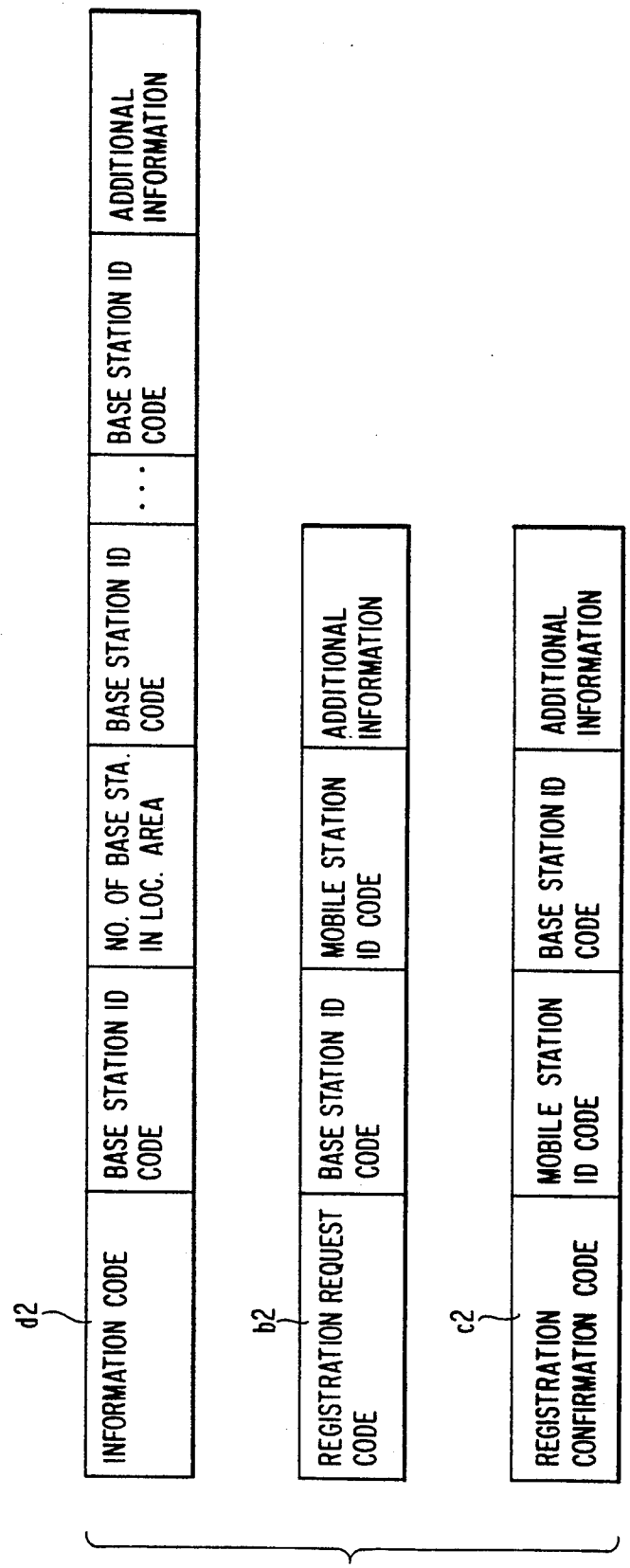
FIG. 12 shows specific formats of signals indicated in FIG. 11.

FIG. 12 shows specific formats of the signals d2, b2 and c2 appearing in the sequence of FIG. 11.

As shown, the location information signal d2 has a notification code indicating that the signal d2 is a notifying signal, a base station ID code (identification ZSi) representative of a transmitting base station Zi, the number of base stations residing in a location area PAi whose reference is the base station Zi, ID codes (identifications ZS) representative of the base stations BS situated in the location area PAi, and additional information. The registration signal b1 and registration confirmation signal c1 may be implemented with the same formats as those of the first embodiment.

The operation of the second embodiment will be described with reference to FIGS. 1, 11 and 12.

When the power source of the mobile station 1 is applied in the radio zone Z5, it sends the registration signal b2 to register the location thereof. In response, the radio base station BS5 existing in the radio zone Z5 registers the location of the mobile station 1 and then transmits a registration confirmation signal c2 to the mobile station 1. On receiving the signal c2, the mobile station 1 memorizes the radio zone Z5 by using, for example, the identification ZS5 thereof. Assume that the mobile station 1 moves from the radio zone Z5 to the radio zone Z12 by way of the radio zone Z8. When the mobile station is handed over from the radio zone Z5 to the radio zone Z8, it does not have to register its location since a location information signal PA8 including the radio zone Z5 is being generated in the radio zone Z8. However, when the mobile station 1 is handed over from the radio zone Z8 to the radio zone Z12, the mobile station 1 registers its location since the radio zone Z5 is not included in a location information signal d2 being generated there. Even when the mobile station 1 registered its location in the radio zone Z12 immediately returns to the radio zone Z8, it is not necessary for the station 1 to register the location in the radio zone Z8 all over again since the location information signal d2 being generated there includes the radio zone Z12.

As stated above, this embodiment is as successful as the previous embodiment in promoting efficient location registration and calling by broadcasting.

FIG. 13 shows a specific construction of the mobile station 1 included in the second embodiment. As shown, the mobile station 1 has a registered radio zone memory 31 in addition to the antenna 11, transceiver 12, current location area identification detector 13, route memory 15, and registration signal generator 16. The registered radio zone memory 31 is a substitute for the location information memory 14, FIG. 6, and memories the identification ZSi of a radio zone where the mobile station 1 has registered the location as a registration identification.

Each radio base station BSi cooperative with the mobile station 1 having the above construction may be implemented with the construction shown in FIG. 7. It should be noted that in the second embodiment, the location information d2 is notified to the own radio zone by the location information generator.

Figure 14:
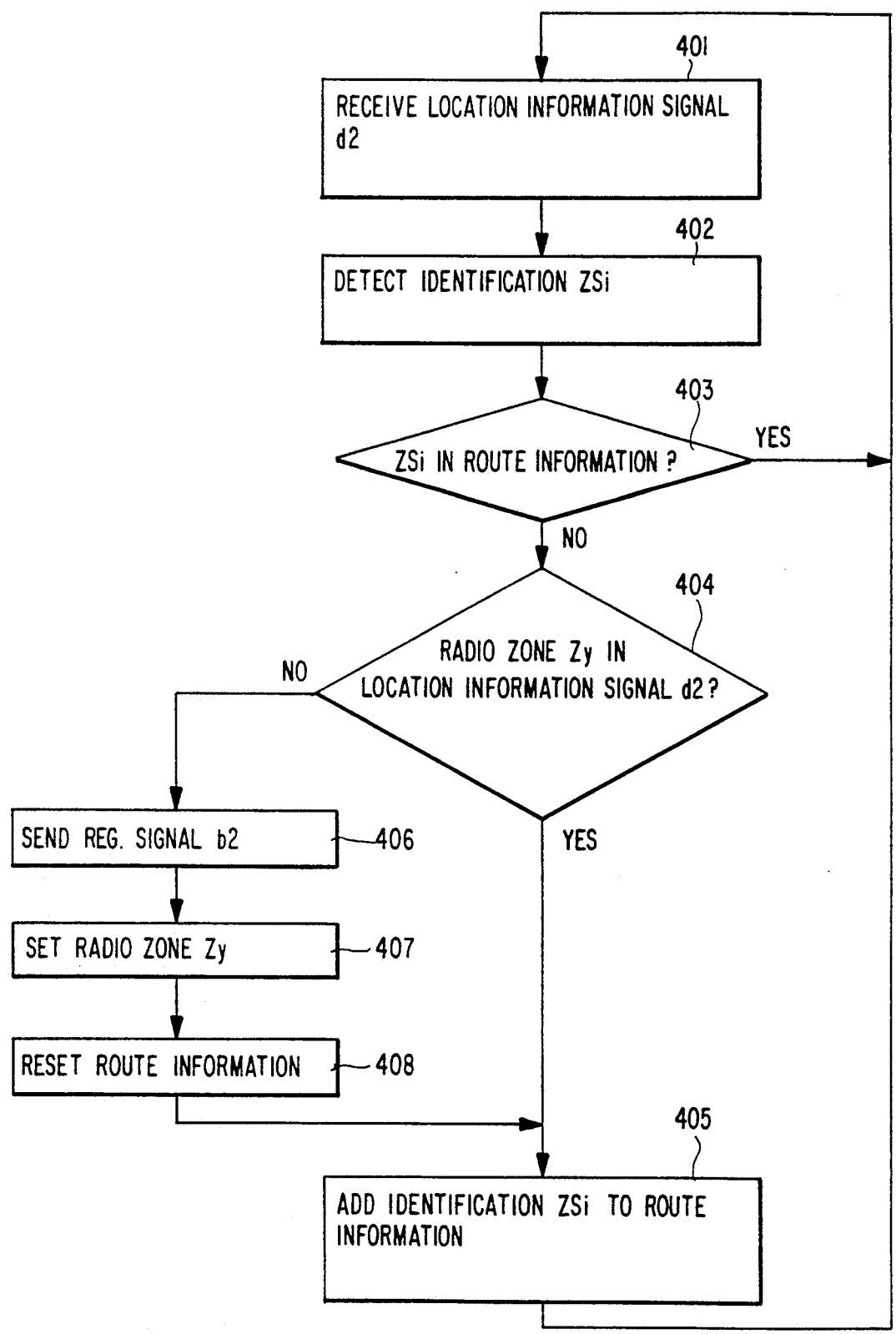
FIG. 14 is a flowchart indicating a specific location registering operation of the mobile station shown in FIG. 13.

Referring to FIGS. 1 and 14, the operation of the mobile station 1 shown in FIG. 13 will be described.

In the second embodiment having the mobile station 1 and radio base station BSi shown in FIGS. 13 and 7, respectively, each base station BSi continuously sends a location information signal d2, FIG. 12, representative of a location area PAi which is based on the own radio zone Zi. When the mobile station 1 receives the location information signal d2 via the antenna 11 and transceiver 12 (step 401), the current location area identification detector 13 detects the identification ZSi of the radio zone Zi where the transmitting base station BSi is situated (step 402). Subsequently, the detector 13 determines whether or not the detected identification ZSi exists in the route information stored in the route memory 15 (step 403). If the answer of the step 403 is YES, the program simply returns to the step 401. If the answer of the step 403 is NO, the detector 13 determines whether or not the identification ZSy (y being a natural number; sometimes referred to as a registration identification ZSy hereinafter) of the last radio zone Zy where the mobile station registered the location and stored in the registered radio zone memory 31 exists in the location information signal d2 (step 404). If the answer of the step 404 is YES, the detector 13 adds the identification ZSi of the radio zone Zi to the route information stored in the route memory 15 (step 405) and then returns to the step 401. If the answer of the step 404 is NO, the detector 13 commands the registration signal generator 16 to sent a registration signal b2. In response, the registration signal generator 16 generates a registration signal b2 and sends it to the base station BSi via the transceiver 12 and antenna 11 (step 406). At the same time, the detector 13 updates the registered radio zone Zy stored in the registered radio zone memory 31 (step 407). Subsequently, the detector 13 once resets the route information stored in the route memory 15 (step 408) and then adds the identification ZSi of the radio zone Zi detected from the signal d2 to the route information (step 405). Thereafter, the program returns to the step 401. In this manner, the mobile station 1 shown in FIG. 13 travels while generating route information representative of the radio zones Zi which it has passed.

Radio base stations BSi cooperative with the mobile station shown in FIG. 13 each is implemented with the construction shown in FIG. 7 except that the location information signal d1 is continuously transmitted from the base station BSi and not sent in response to the registration signal c1. On receiving the registration signal b2 and route information signal included therein from the mobile station 1, the base station BSi executes the same sequence of steps as the base station of the first embodiment.

How the second embodiment having the mobile station 1 shown in FIG. 13 and the radio base station BSi shown in FIG. 7 generate route information will be described with reference to FIG. 1.

Assume that the mobile station 1 having registered the location thereof in the radio zone Z5 moves to the radio zone Z12 by way of the radio zone Z8. Just after the registration in the radio zone Z5, the mobile station 1 holds the identification ZS5 of the registered radio zone Z5 in the route memory 15 as route information. So long as the mobile station 1 moves in the radio zone Z5, it continuously receives the location information signal d2 including the information associated with the location area PA5 and detects the identification ZS5 thereoutof. In this condition, the mobile station 1 does not execute any processing with the identification ZS5 and simply waits for a location information signal d2 since the identification ZS5 is included in the route information. On entering the radio zone Z8, the mobile station 1 receives a location information signal d2 including information associated with the location area PA8 which is continuously sent from the radio base station BS8 of the radio zone Z8. At this time, the identification ZS8 detected by the mobile station 1 is not included in the route information. Hence, the mobile station 1 determines whether or not the identification ZS5 of the registered radio zone held therein is included in the location area PA8. Since the identification ZS5 is included in the location area PA8, the mobile station adds the identification ZS8 to the route information to produce new route information (ZS5, ZS8), and again waits for a location information signal d2. When the mobile station 1 is handed over from the radio zone Z8 to the radio zone Z12, the identification ZS12 which will be detected out of a received location information signal d2 then is not included in the route information held in the mobile station 1, and the identification ZS5 of the registered radio zone held in the station 1 is not included in the location area PA12. As a result, the mobile station 1 registers the location thereof in the base station BS12 of the radio zone Z12 by using the registration signal b2. At this instant, the mobile station 1 transmits, together with the registration signal b2, the sequence of identifications or route information (ZS5, ZS8) to the base station BS12. Subsequently, the mobile station writes ZS12 in the route memory 15 as an identification representative of the registered radio zone Z12, once resets the route information, adds the identification ZS12 to the route information to hold (ZS12), and again waits for a location signal d2.

On receiving the registration signal b2 and route information (ZS5, ZS8) included therein, the base station BS12 sends a registration confirmation signal c2 to the mobile station 1 and increments the cumulative counts of the identifications ZS5 and ZS8 included in the received route information by one. Thereupon, the base station BS12 sequentially selects n radio zones having greater cumulative values and defines a new location area PA12 having the n radio zones and the own radio zone Z12. In the figure, the number n of radio zones belonging to the location area PA is assumed to be nine.

Figure 15:
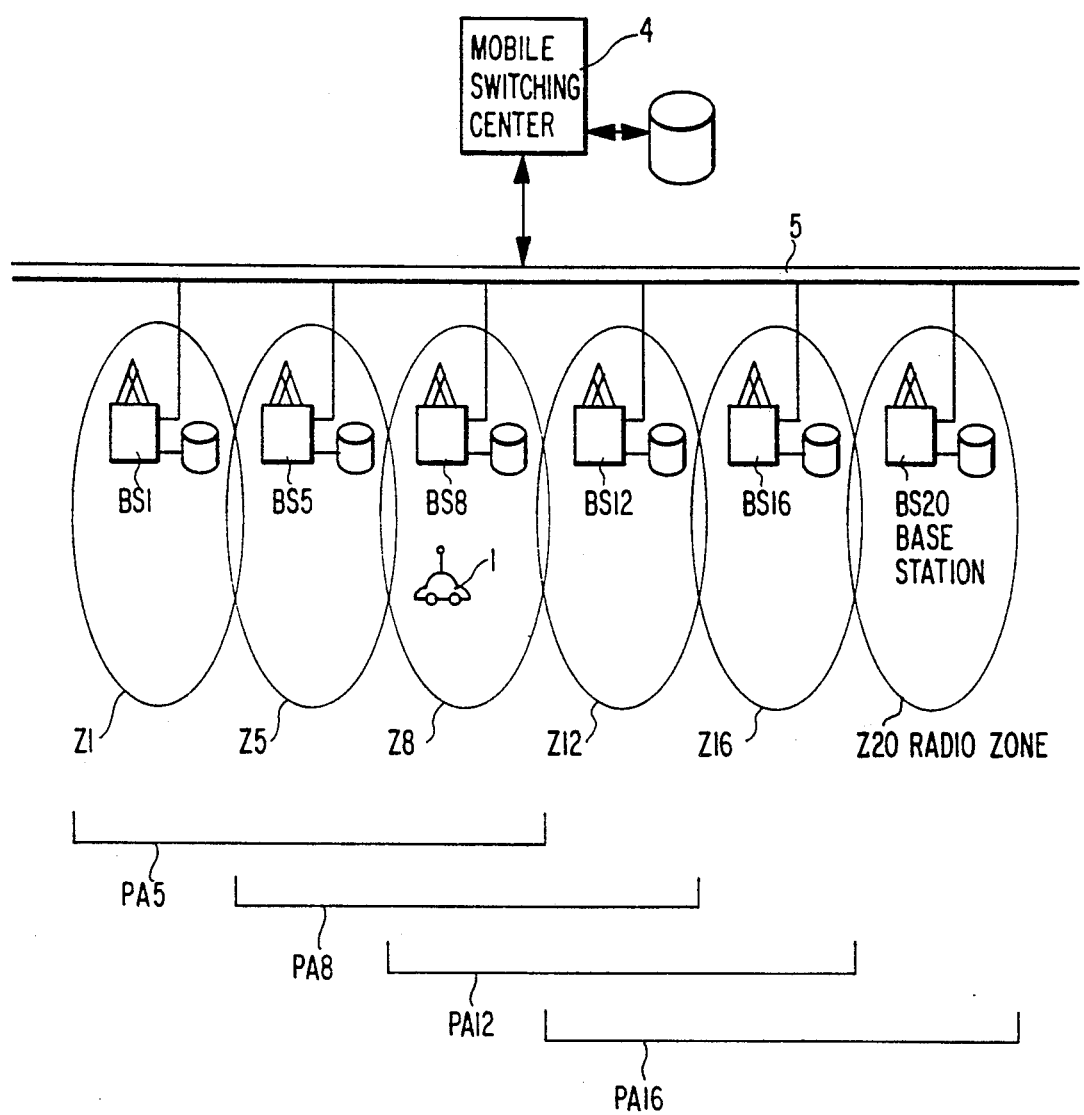
FIG. 15 is a diagram showing a system construction representative of a third embodiment of the present invention.

Referring to FIG. 15, a third embodiment of the present invention has a bus 5 in addition to the mobile station 1, mobile switching center 4, multiple radio zones Z (Z1, Z5, Z8, Z12, Z16, and Z20), and multiple radio base stations BS (BS1, BS5, BS8, BS12, BS16 and BS20). Location areas PA (PA5, PA8, PA12 and PS16) are defined on the basis of the base stations BS5, BS8, BS12 and BS16, respectively. The mobile switching center 4 and the base stations BS controlled by the switching center 4 are interconnected by the bus 5. It is to be noted that the mobile station 1, radio zones Z, base stations BS and location areas PA are representative of the same system architecture as the system of FIG. 1. The mobile station 1 moves while generating route information showing the radio zones Zi which the station 1 has passed. The base stations BSi each has a counter for cumulatively counting the identifications ZSi of the individual radio zones Zi and determines a particular location area PAi on the basis of the own radio zone Zi. The mobile switching center 4 includes the radio link controller 12 shown in FIG. 1. The mobile switching center 4 holds information showing at which base station Zi the mobile station 1 has registered the location and, on receiving a call meant for the mobile station 1, calls all of the base stations BS by broadcasting. While the mobile switching center 4 and the base stations BS are shown as being interconnected by the bus 5 which is often used with a packet network and desirable in broadcasting ability, the bus 5 may be replaced with a star connection, if desired.

In FIG. 15, assume that the current location area PA includes the radio zones Z1, Z5 and Z8, that the location area PA8 included the radio zones Z5, Z8 and Z12, that the location area PA12 includes the radio zones Z8, Z12 and Z16, and that the location area PA16 includes the radio zones Z12, Z16 and Z20. Such location areas PA defined by the linearly arranged radio zonez Zi will occur when the mobile station 1 moves, for example, a thruway only in one direction.

FIG. 16 shows a specific construction of the radio base station BSi which is applicable to the third embodiment of the present invention. As shown, the radio base station BSi has an antenna 21, a transceiver 22, a location information transceiver 41, a comparator 42, and a location information memory 43. The base station BSi receives a calling signal sent from the mobile switching center 4 by broadcasting by the location information transceiver 41 and transfers it to the comparator 42. In response, the comparator 42 compares the received calling signal with information of the own location area PAi to see if the identification ZSy of the radio zone where the called mobile station 1 has registered the location is stored in the location information memory 43. If the identification ZSy is stored in the memory 43, the base station sends out a paging signal to the own radio zone Zi via the transceiver 22 and antenna 21. The location information memory 43 plays the role of the route information detector 23, adjacent radio zone memory 24, location information decision unit 25, and location information memory 26, FIG. 7. The transceiver 22 shown in FIG. 16 includes the function of the location information generator, FIG. 7.

The location registering and paging procedure particular to the third embodiment will be described with reference to FIGS. 15 and 16.

When the mobile station 1 registers the location thereof in the radio zone Z8, the radio base station BS8 situated in the radio zone Z8 sends the identification ZS8 thereof and the identification MS1 of the mobile station 1 to the mobile switching center 4 via the location information transceiver 41. In response, the mobile switching center 4 updates the registration data associated with the mobile station 1 and stored thereinside.

When a call meant for the mobile station 1 is terminated at the mobile switching center 4, the center 4 scans the registration data to search for the identification ZS8 of the radio zone Z8 where the station 1 has registered the location. Then, the mobile switching center 4 sends a calling signal including the identification MS1 of the mobile station 1 and the identification ZS8 of the radio zone Z8 by broadcasting to all of the base stations Z which it governs. In response, the base stations BSi each compares the identification ZS8 of the radio zone Z8 with the identifications of the radio zones belonging to the associated location area PAi. Then, each of the base stations BS5, BS8 and BS12 having the identification ZS8 in their associated location areas PA5, PA8 and PA12 sends a paging signal to the radio zone Z1, Z5, Z8, Z12 or Z16 to call the mobile station 1. By such a procedure, once the mobile station 1 registers the location thereof, it will be called up in every radio zone Z which it passes without registration.

Specific registration data held by the mobile switching center 4 is shown in FIG. 17 and contituted by a column assigned to mobile station identification MS and a column assigned to registered radio zone identifications ZS. The mobile switching station 4 memorizes a particular radio zone in which the mobile station 1 is currently registered. Regarding a mobile station 1 with the identification MS4, for example, the latest radio zone in which the mobile station 1 has been registered is the radio zone Z8.

This embodiment, like any one of the previous embodiments, allows each base station BSi to set up an overlapping location area PAi independently of the others by using route information received from the mobile station having been registered in the own radio zone Zi. An extra advantage achievable with this embodiment is that the mobile switching center 4 does no have to manage the information of location areas Pai of each base station, i.e., each base station BSi is capable of calling on the basis of its own decision to free the center 4 from excessive loads.

Figure 18:
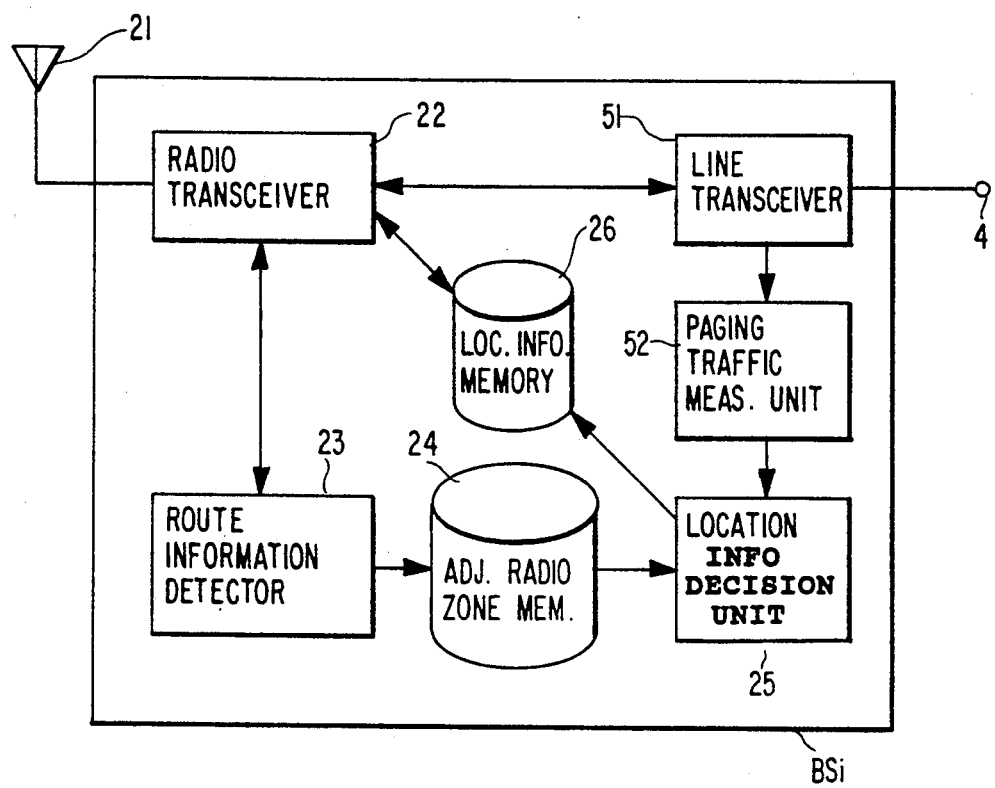
FIG. 18 is a block diagram schematically showing a specific construction of a radio base station included in a fourth embodiment.

Referring to FIG. 18, a fourth embodiment of the present invention will be described. As shown, the radio base station BSi has a line transceiver 51 and a ringing traffic measuring unit 52 as well as the antenna 21, radio transceiver 22, route information detector 23, adjacent radio zone memory 24, location information decision unit 25, and location information memory 26, FIG. 7. The radio transceiver 22 shown in FIG. 18 includes the function of the location information generator 27. The line transceiver 51 interchanges signals with the mobile switching center 4. The ringing traffic measuring unit 52 measures the traffic of ringing signals due to the calling of the own radio zone by the base stations, the ringing signals being included in signals which the line transceiver 51 receives from the mobile switching center 4. Based on the result of measurement and according to an adaptation rule shown in FIG. 19, the location information decision unit 25 causes the location information memory 26 to store the same number of radio zone identifications ZS as the number n of radio zones Z constituting the location area PAi where the base station BSi is situated. The adjacent radio zone memory 24 holds route information in a suitable data format such as shown in FIG. 8. The number of times that the identification ZSx of each radio zone Zx included in route data appears is determined and stored in the memory 24 as frequency data. Such frequency data is the original data for defining the own station's location area PAi. The rest of the construction and operation is the same as in FIG. 7.

Figure 19:
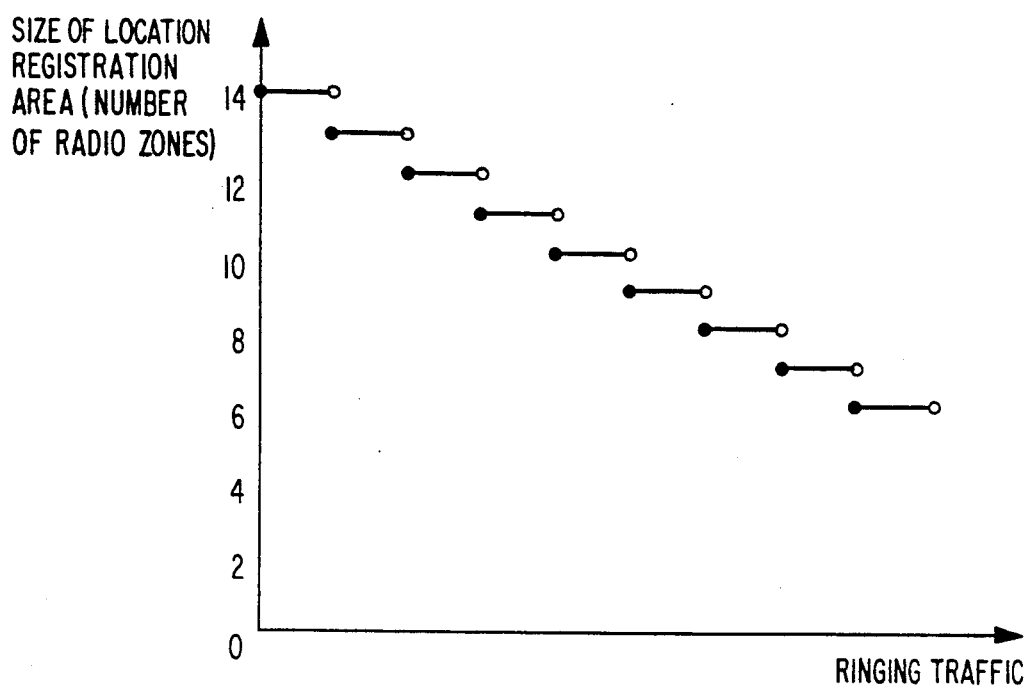
FIG. 19 indicates a specific rule which a location information decision unit included in the radio base station of FIG. 18 obeys.

In FIG. 19, the specific rule which the location information decision unit 25 observes is such that as the ringing traffic increases, the size of the location area, i.e., the number of radio base stations BS belonging to the location area PAi whose reference is the base station BSi of interest decreases. In a given range of ringing traffic, the number of radio base stations belonging to the location area is constant.

Figure 20:
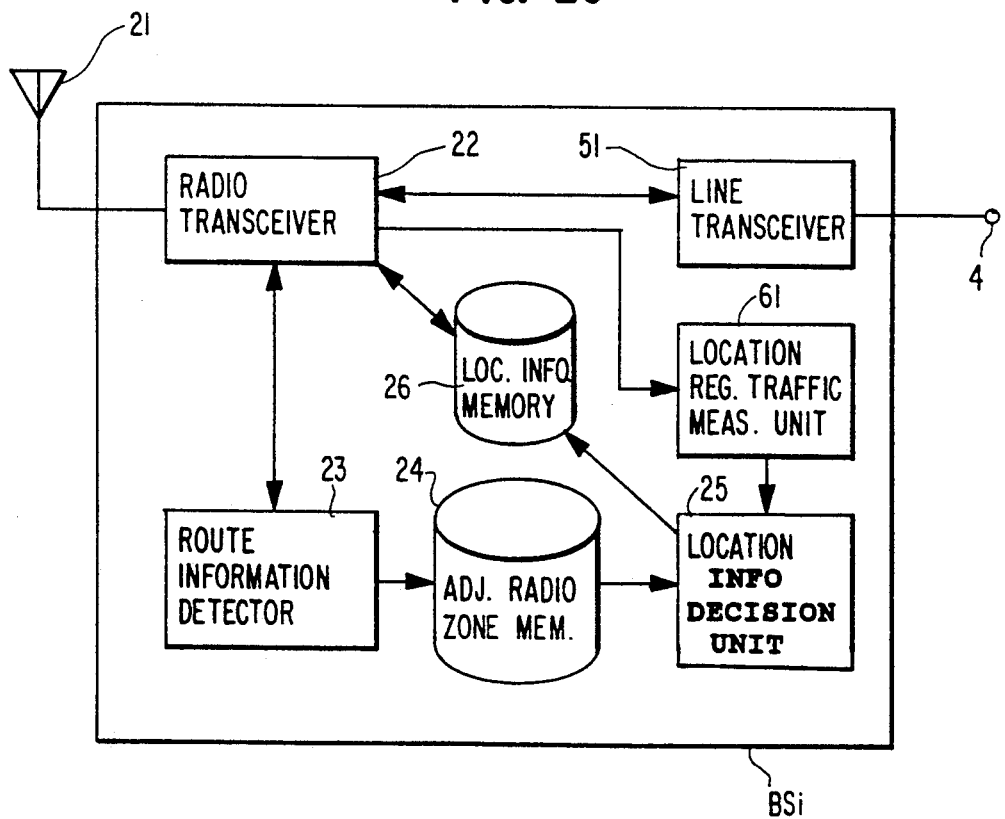
FIG. 20 is a block diagram schematically showing a specific construction of a radio base station included in a fifth embodiment.

Referring to FIG. 20, a fifth embodiment of the present invention is shown which is essentially the same as the embodiment of FIG. 18 except that a location registration traffic measuring unit 61 is substituted for the ringing traffic measuring unit 52. The location registration traffic measuring unit 61 measures the traffic of registration signals which the radio transceiver 22 receives from mobile stations. Based on the result of measurement and according to a specific adaptation rule shown in FIG. 21, the location information decision unit 25 causes the location information memory 26 to store the same number of radio zone identifications ZS as the number n of radio zones Z constituting the own station's location area PAi. The rest of the construction and operation is the same as in FIG. 18.

Figure 21:
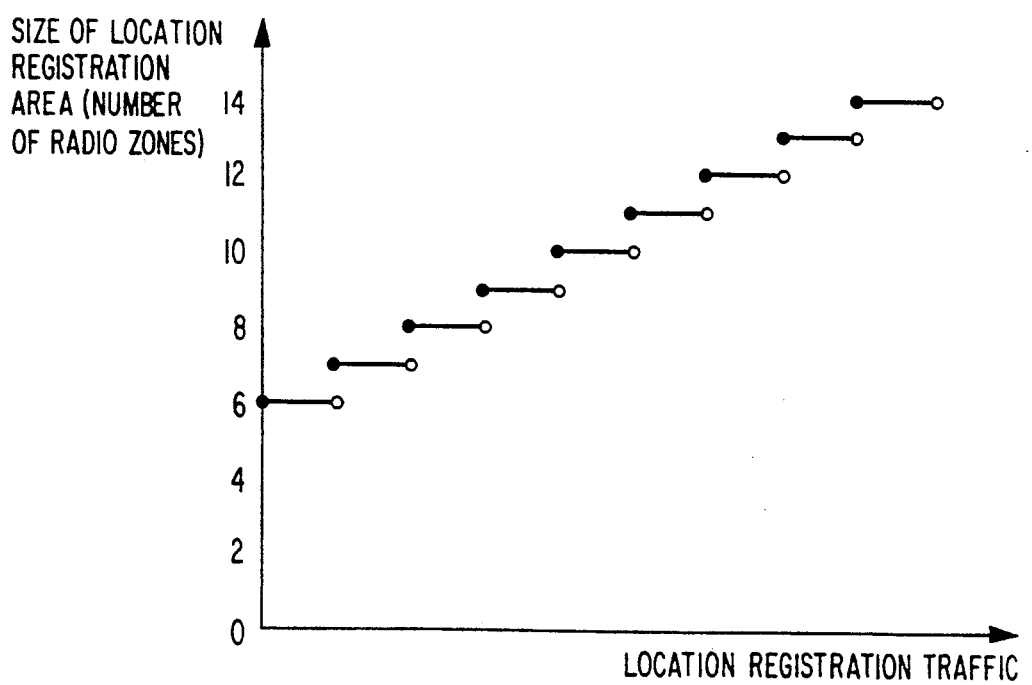
FIG. 21 indicates a specific rule which a location information decision unit included in the radio base station of FIG. 20 obeys.

In FIG. 21, the specific rule which the location information decision unit 25 observes is such that as the traffic of registration signals increases, the size of the location area, i.e., the number of radio base stations BS belonging to the location area PAi whose reference is the base station BSi of interest increases. In a given range of registration signal traffic, the number of radio base stations belonging to the location area is constant.

Figure 22:
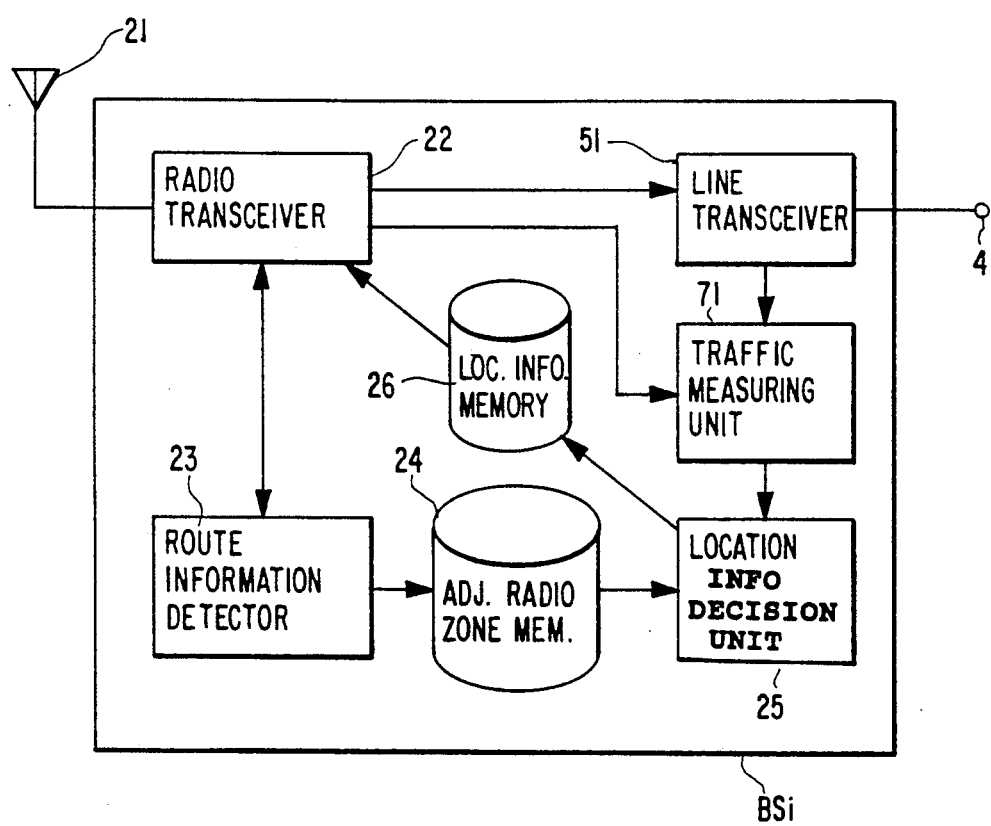
FIG. 22 is a block diagram schematically showing a specific construction of a radio base station included in a sixth embodiment.

FIG. 22 shows a sixth embodiment of the present invention which is essentially the same as the embodiment of FIGS. 18 or 20 except for a traffic measuring unit 71. Specifically, the traffic measuring unit 71 plays the role of the ringing traffic measuring unit 52 shown in FIG. 18 and the role of the location registration traffic measuring unit 61 shown in FIG. 20.

Figure 23:
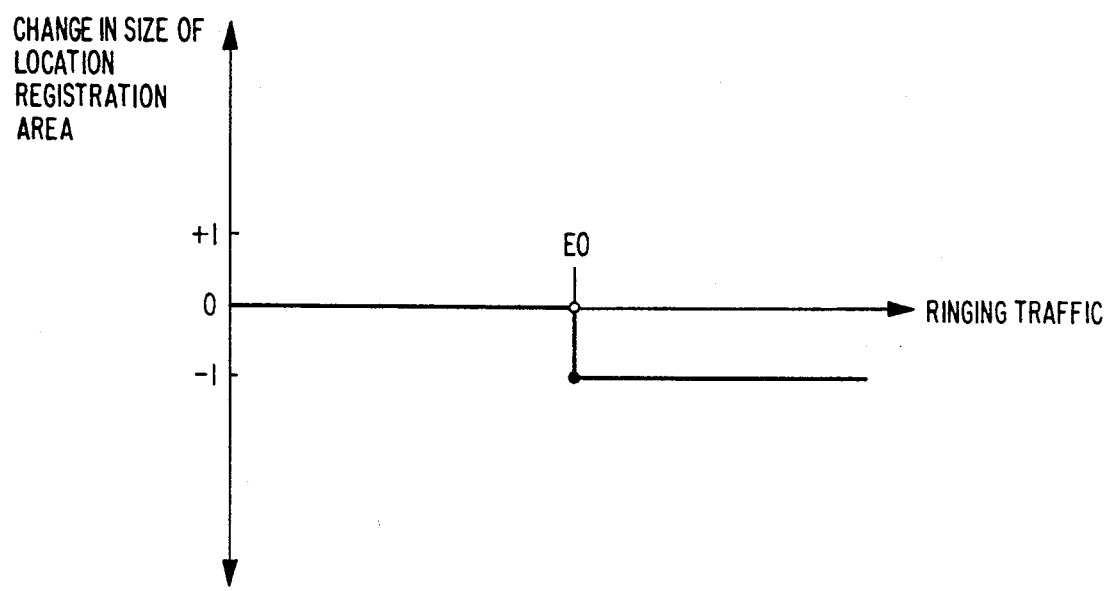
FIG. 23 indicates a specific rule which a location information decision unit included in the radio base station of FIG. 22 obeys.

The traffic measuring unit 71 performs two different kinds of measurement. First, the traffic measuring unit 71 measures the traffic of ringing signals included in signals which the line transceiver 51 receive from the mobile switching center 4. FIG. 23 shows a specific adaptation rule pertaining to such measurement of ringing signal traffic. As shown, when the result of measurement is greater than a given predetermined threshold E0, the location information decision unit 25 reduces the number n of the radio zones Z constituting the own station's location area PAi by one.

Figure 24:
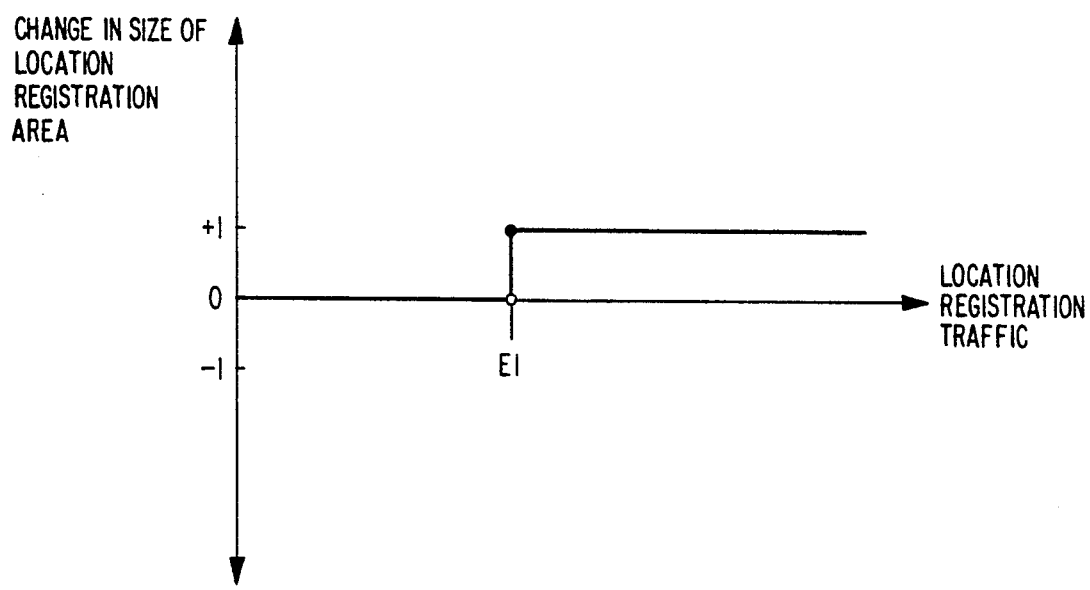
FIG. 24 shows another specific rule which the decision unit of the radio base station of FIG. 22 obeys.

At the same time, the traffic measuring unit 71 measures the traffic of registration signals of signals received by the radio transceiver 22, the registration signal being used to register the location for the own base station. According to a specific adaptation rule shown in FIG. 24, the traffic measuring unit 71 increases the number n of radio zones Z constituting the own station's location area PAi by one when the result of measurement is greater than a predetermined threshold E1. In this manner, the location information decision unit 25 determines the number n of radio zones Z constituting the own station's location area PAi and transfers the same number of radio zone identifications ZS as the number n of radio zones Z from the adjacent radio zone memory 24 to the location information memory 26 according to the order of frequency. Such two different kinds of measurement are performed periodically, and the location information decision unit 25 determines whether to increase the number of radio zones Z constituting the location area PAi or to decrease it each time.

Of course, the location area setting method which reduces the number of radio zones Z included in the location area PAi when the registration signal traffic is greater than a threshold as stated above is applicable to the fourth embodiment also. Likewise, the method which increases the number of radio zones included in the location area PAi when the registration signal traffic is greater than a threshold is applicable to the fifth embodiment.

As stated above, the fourth to sixth embodiments, like the first to third embodiments, allow each radio base station to set up a location area independently of the others by using route information sent from a mobile station having been registered in the own radio zone, thereby implementing overlapping location areas. Further, the radio base station of any one of the fourth to sixth embodiments changes the size of the location area particular thereto in matching relation to the ringing traffic and registration signal traffic. This is successful in preventing the load from centering on par of the radio base stations, i.e., in distributing the loads to a number of radio base stations.

Although the invention has been described with reference to the specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that appended claims will cover any modifications or embodiments as fall within the true scope of the invention.

What is claimed is:

1. A mobile station for a mobile communication system, comprising:
   communication means for communicating over a radio channel with a radio base station situated in a radio zone where said mobile station exists;
   location information storing means, coupled to said communication means, for storing location information received from a radio base station situated in a radio zone where said mobile station has registered a location;
   route storing means, coupled to said communication means, for storing route information representative of a radio zone where said mobile station has registered a location and representative of at least a part of the radio zones which said mobile station has passed after the location registration;
   deciding means for determining whether location information representative of a radio zone where said mobile station exists is included in said location information stored in said location information storing means;
   means for adding, when said deciding means determines that said location information representative of the radio zone where said mobile station exists is included in said location information stored in said information storing means, said location information representative of the radio zone where said mobile station exists to said route information of said route storing means; and
   means for adding, when said deciding means determines that said location information representative of the radio zone where said mobile station exists is not included in said location information stored in said information storing means, said location information representative of the radio zone where said mobile station exists to said route information of said route storing means and for reporting said location information representative of the radio zone where said mobile station exists to a radio base station situated in said radio zone.

2. A mobile station for a mobile communication system, comprising:
   communication means for communicating over a radio channel with a radio base station situated in a radio zone where said mobile station exists;
   registered radio zone storing means, coupled to said communication means, for registering identification information representative of a radio zone where said mobile station has registered a location as a registered radio zone;
   route storing means for storing route information representative of a radio zone where said mobile station has registered a location and route information representative of at least part of radio zones which said mobile station has passed after the location registration;
   deciding means for determining whether said identification information representative of said registered radio zone is included in location information received from a radio base station within the radio zone to which said mobile station has moved;
   means for adding, when said deciding means determines that said identification information representative of said registered radio zone is included in said location information, said identification information representative of said radio zone to which said mobile station has moved to said route information stored in said route storing means; and
   means, coupled to said communication means, for informing, when said deciding means determines that said identification information representative of said registered radio zone is not included in said location information, said radio base station of said radio zone to which said mobile station has moved of said route information and for registering a location in said radio base station.

3. A location registration procedure for a mobile communication system comprising:
   a plurality of radio zones defined by dividing a service area;
   a plurality of radio base stations each being situated in a respective one of said radio zones;
   a plurality of location areas each comprising a set of at least two of said radio zones; and
   a plurality of mobile stations each movable in said service area, and communicable with any one of said radio base stations over a radio channel for registering a location of said mobile station corresponding to where said mobile station exists in one of said radio zones;

said radio base stations each memorizing location registration information representative of a plurality of identifiers of radio zones which are situated in the neighborhood of a reference radio zone which is a representative radio zone of each of said location areas and notifying, after receiving a registration signal from a mobile station existing in said reference radio zone of said base station, said mobile station of said location registration information;

said mobile stations each storing said location registration information received from said radio base station and, after moving to a radio zone whose identifier is not included in said stored location registration information, registering a new location thereof.

4. A location registration procedure for a mobile communication system comprising:

a plurality of radio zones defined by dividing a service area;

a plurality of radio base stations each being situated in a respective one of said radio zones;

a plurality of location areas each comprising a set of at least two of said radio zones; and a plurality of mobile stations each movable in said service area, and communicable with any one of said radio base stations over a radio channel for registering a location of said mobile station corresponding to where said mobile station exists in one of said radio zones;

said radio base stations each memorizing location registration information representative of a plurality of identifiers of radio zones which are situated in the neighborhood of a reference radio zone which is a representative radio zone of each of said location areas and broadcasting said location registration information continuously in said radio zone where said radio base station is situated;

said mobile stations each registering the identifier of said radio zone where said mobile station has registered a location last and, after moving to a radio zone whose said broadcast location registration information does not include said registered identifier, registering a new location thereof.

5. A paging procedure for mobile communication comprising:

a plurality of radio zones defined by dividing a service area;

a plurality of location areas each comprising a set of at least two of said radio zones;

a plurality of radio base stations each being situated in a respective one of said radio zones; a mobile switching center for governing at least two of said radio base stations collectively;

a plurality of mobile stations each movable in said service area, and communicable with any one of said radio base stations over a radio channel for registering a location of said mobile station corresponding to where said mobile station exists in one of said radio zones;

said radio base stations each memorizing location registration information representative of a plurality of identifiers of the radio zones which are situated in the neighborhood of a reference radio zone which is a representative radio zone of each of said location areas;

said mobile switching center storing identifiers of radio zones where said mobile station had registered a location as a registered radio zone identifier associated with said mobile station in a location table, and determining, in response to a terminating call directed to one of said mobile stations, said registered radio zone identifier on the basis of said location table, and broadcasting a calling signal including said registered radio zone identifier and said mobile station identifier to said radio base stations which said mobile switching center governs; and causing each of said radio base stations that receive said calling signal to effect paging in a radio zone where said radio base station is situated, if said memorized location registration information includes said registered radio zone identifier from said mobile switching center.

6. A location registration information setting procedure for a mobile communication system comprising:

a plurality of radio zones defined by dividing a service area;

a plurality of radio base stations each being situated in a respective one of said radio zones;

a plurality of location areas each comprising a set of at least two of said radio zones among which a representative one of said radio zones is assigned as a reference radio zone; and a plurality of mobile stations each movable in said service area, and communicable with any one of said radio base stations over a radio channel for registering a location of said mobile station corresponding to where said mobile station exists in one of said radio zones and for storing route information including at least part of the identifiers of radio zones which said mobile station has passed and for notifying a radio base station situated in a radio zone where said mobile station exists of said route information;

said radio base stations each comprising:

means for accumulating the appearance frequency of an individual radio zone identifier included in said route information which is reported by mobile stations; and means for setting a set of radio zone identifiers which is selected from said accumulated radio zone identifiers and a reference radio zone identifier as reference location registration information.

7. A location registration information setting procedure as claimed in claim 6, wherein said radio base stations each sets a set of radio zone identifiers whose cumulative appearance frequencies exceed a predetermined value and a reference radio zone where said radio base station is situated as new reference location registration information.

8. A location registration information setting procedure for a mobile communication system comprising:

a plurality of radio zones defined by dividing a service area;

a plurality of radio base stations each being situated in a respective one of said radio zones;

a plurality of location areas each comprising a set of at least two of said radio zones among which a representative one of said radio zones is assigned as a reference radio zone; and a plurality of mobile stations each movable in said service area, and communicable with any one of said radio base stations over a radio channel for registering a location of said mobile station corresponding to where said mobile station exist in one of said radio zones;

said radio base stations each comprising:

means for setting a set of identifiers of more than one radio zone including the reference radio zone where said radio base station is situated as location registration information; and means for increasing and decreasing the number of radio zone identifiers included in said location registration information in response to the traffic of paging signals transmitted to said mobile stations in said reference radio zone.

9. A location registration information setting procedure for a mobile communication system comprising:

a plurality of radio zones defined by dividing a service area;

a plurality of radio base stations each being situated in a respective one of said radio zones;

a plurality of reference radio zones each comprising a set of at least two of said radio zones among which a representative one of said radio zones is assigned as a reference radio zone; and a plurality of mobile stations each movable in said service area, and communicable with any one of said radio base stations over a radio channel for registering a location of said mobile station corresponding to where said mobile station exists in one of said radio zones;

said radio base stations each comprising:

means for setting a set of identifiers of at least one radio zone including said reference radio zone where said radio base station is situated as location registration information; and means for increasing and decreasing the number of radio zone identifiers included in said location registration information in response to the traffic of registration signals received from said mobile stations existing in said reference radio zone.

10. A location registration information setting procedure for a mobile communication system comprising:

a plurality of radio zones defined by dividing a service area;

a plurality of radio base stations each being situated in a respective one of said radio zones;

a plurality of mobile stations each movable in said service area, and communicable with any one of said radio base stations over a radio channel for registering a location of said mobile station corresponding to where said mobile station exists in one of said radio zones;

a plurality of reference radio zones each comprising a set of at least two of said radio zones among which a representative one of said radio zones is assigned as a reference radio zone;

said radio base stations each comprising:

means for setting a set of identifiers of more than one radio zone including said reference radio zone where said radio base station is situated as location registration information; and means for decreasing, when the traffic of paging signals transmitted to said mobile stations in said reference radio zone exceeds a first predetermined amount, the number of radio zone identifiers included in said location registration information;

means for increasing, when the traffic of registration signals received from said mobile stations existing in said reference radio zone exceeds a second predetermined amount, the number of radio zone identifiers included in said location registration information.

* * * * *

UNITED STATES PATENT AND TRADEMARK OFFICE
CERTIFICATE OF CORRECTION

PATENT NO. :   5,305,466
DATED      :   April 19, 1994
INVENTOR(S):   Masanori TAKETSUGU It is certified that error appears in the above-identified patent and that said Letters Patent is hereby corrected as shown below:

Col. 2, line 4, delete "lastest" and insert --latest--.

Col. 8, line 8, delete "al" and insert --a1--.

Col. 10, line 59, delete "al" and insert --a1--;

Col. 10, line 64, delete "al" and insert --a1--.

Col. 15, line 8, delete "cl" and insert --c1--.

Col. 16, line 43, delete "zonez" and insert --zone--.

Col. 17, line 47, delete "no" and insert --not--;

Col. 17, line 48, delete "Pai" and insert --PAi--.

Col. 19, line 34, delete "par" and insert --part--.

Signed and Sealed this

Twentieth Day of September, 1994

Attest:

BRUCE LEHMAN

Attesting Officer    Commissioner of Patents and Trademarks